United States Patent [19]

Brunson

[11] Patent Number: 5,144,207
[45] Date of Patent: Sep. 1, 1992

[54] CIRCUIT AND METHOD FOR IGNITING AND OPERATING AN ARC LAMP

[76] Inventor: Robert L. Brunson, 15860 Emma La., Moreno Valley, Calif. 92370

[21] Appl. No.: 763,428

[22] Filed: Sep. 20, 1991

Related U.S. Application Data

[62] Division of Ser. No. 351,149, May 12, 1989.

[51] Int. Cl.⁵ .......................................... H05B 41/36
[52] U.S. Cl. ................................... 315/291; 315/307
[58] Field of Search ............... 315/175, 176, 246, 287, 315/290, 291, 307

[56] References Cited

U.S. PATENT DOCUMENTS

| | | | |
|---|---|---|---|
| 1,286,590 | 12/1918 | Grether | 362/188 |
| 1,291,483 | 1/1919 | Grether | 362/188 |
| 1,369,892 | 3/1921 | Hawthorne | 362/188 |
| 1,825,354 | 9/1931 | Jones | 362/188 |
| 2,982,881 | 5/1961 | Reich | 315/205 |
| 3,201,580 | 8/1965 | Moore | 362/157 |
| 3,675,078 | 7/1972 | Levy | 315/289 |
| 3,689,759 | 9/1972 | Dill | 240/10.69 |
| 3,746,920 | 7/1973 | Flatley | 315/170 |
| 4,121,136 | 10/1978 | Fournier et al. | 315/205 |
| 4,240,009 | 12/1980 | Paul | 315/224 |
| 4,317,162 | 2/1982 | Richards et al. | 362/106 |
| 4,450,508 | 5/1984 | Carley | 362/105 |
| 4,499,525 | 2/1985 | Mallory | 362/157 |
| 4,533,984 | 8/1985 | Gatton | 362/232 |
| 4,634,936 | 1/1987 | Gentry et al. | 315/307 |
| 4,782,432 | 11/1988 | Coffman | 362/184 |
| 4,787,022 | 11/1988 | Maeba et al. | 363/52 |
| 5,051,665 | 9/1991 | Garrison et al. | 315/291 X |

*Primary Examiner*—David Mis
*Attorney, Agent, or Firm*—Robert E. Brunson

[57] ABSTRACT

A miniaturized electronic control circuit and method for igniting and controlling the operation of an arc lamp in a hand held search light is disclosed. A modulator provides output pulses at a variable duty cycle to a switched regulator which provides an output voltage to a first electrode of the arc lamp. The magnitude of the output voltage of the regulator varies in accordance with the duty cycle of the output pulses from the modulator. A lamp igniter is coupled between a first control input to the modulator and a second electrode of the arc lamp. The lamp igniter, in response to a first magnitude in the output voltage from the switched regulator, effects the generation of a high voltage pulse to ignite the arc lamp. Substantially at the time of ignition, the lamp igniter provides a signal proportional to lamp current to the control input to the modulator to alter the duty cycle of the output pulses therefrom to change the output voltage from the switched regulator from the first magnitude to a second magnitude to sustain operation of the arc lamp by controlling the current flowing through the arc lamp. The lamp igniter has an inductance serving to minimize in rush current to the lamp during lamp ignition. The electronic control circuit further includes an intensity control switch for providing a light intensity control signal to a second control input to the modulator to effect changes in the duty cycle of the output pulses provided to the switched regulator to selectively change the magnitude of the output voltage from the switched regulator to thus switch the intensity of the light emitted by the arc lamp by changing the magnitude of the current flowing through the arc lamp.

32 Claims, 8 Drawing Sheets

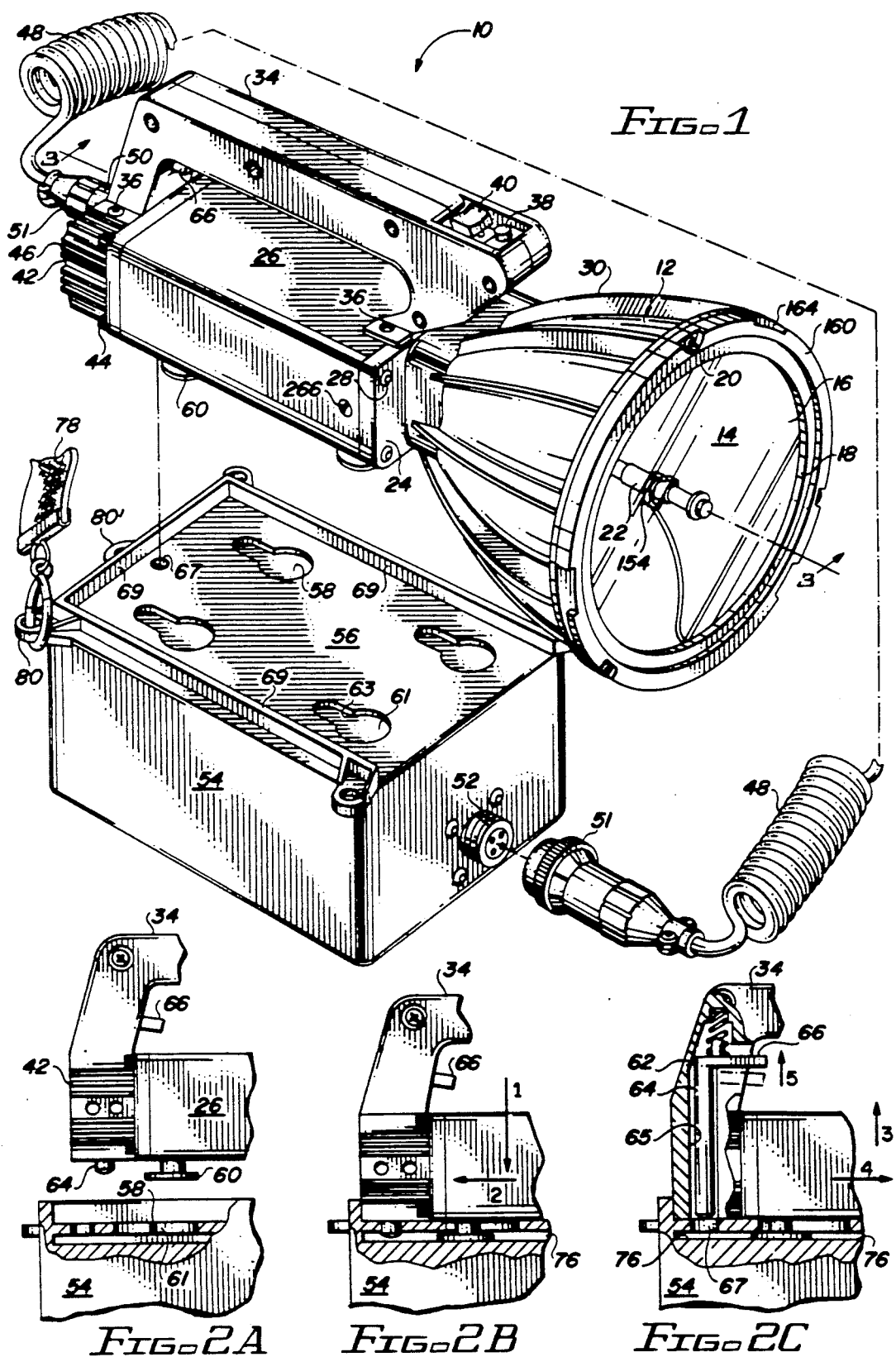

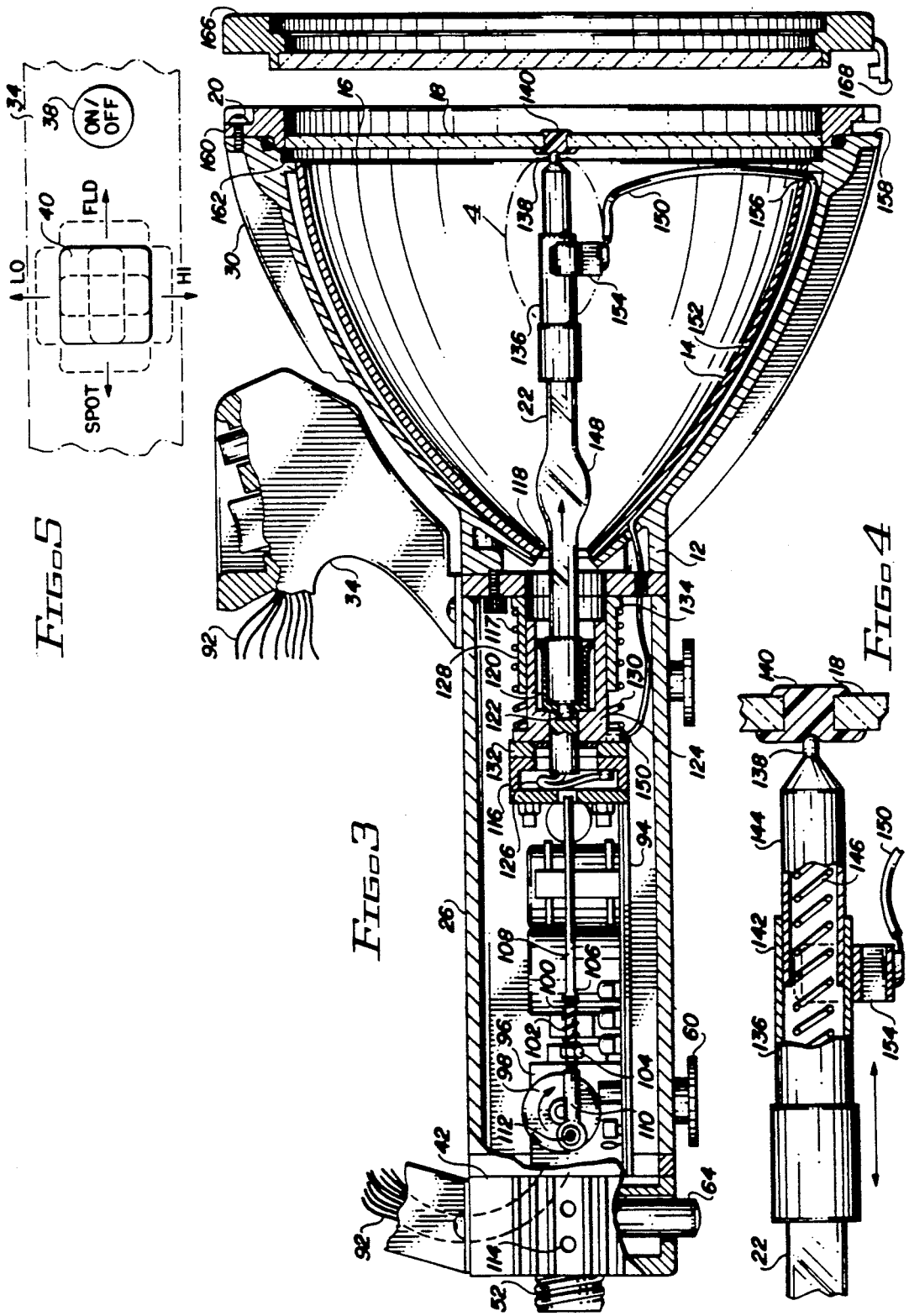

CIRCUIT AND METHOD FOR IGNITING AND OPERATING AN ARC LAMP

This is a divisional of copending application Ser. No. 07/351,149 filed on May 12, 1989.

BACKGROUND OF THE INVENTION

1. Field of the Invention

The present invention relates to search lights and more particularly to portable hand held search lights.

2. Description of the Prior Art

This invention is directed toward hand held search lights of the type which use high intensity lamps, such as xenon arc lamps or the like. Such lamps are frequently referred to as short arc lamps.

The search light contemplated by the invention has its principle use by sentries, police, rescue squads, and others for night time surveillance where high intensity light is required. In these uses, the search light frequently must be carried for long periods and used under adverse conditions. As such, the light should be light in weight, durable, and reliable. Further, it is contemplated that the light will be used in remote locations where trained service personnel are not readily available. To that end, the light must be easily serviceable by untrained personnel and the light must be designed to avoid dangers which can cause injury to such personnel when servicing and operating the light. Arc lamps have been known to explode during lamp, replacement causing severe injury. Thus, a search light is desired which minimizes this danger. Further, complete subassembly change out should be easily accomplished without requiring special training in search light maintenance.

Further, it is desirable that such a search light be easy to operate without having to activate levers or cumbersome switches. The light used should also be easily operable by an operator to perform all lamp operations, such as beam focusing, high/low beam switching, etc. Such operations should be carried out at the touch of the operator's finger or thumb and should not require the use of two hands to operate the light. In addition, it is desirable that the light be remotely controllable so that it can be used in a stationary manner.

In order to provide reliability in such a search light, means must be provided to ensure that the proper voltages and currents are provided to insure that the arc lamp will always light under all conditions. For example, it requires a higher voltage to ignite a cold lamp than it does to ignite a hot lamp. It is well known that the electrodes of an arc lamp erode with usage. This further adds to the problem of insuring that the proper voltages and currents are always applied to the lamp to ensure reliable ignition and operation of the lamp.

The successful operation of a xenon lamp, or the like, requires a power supply capable of supplying a current regulated power source to insure proper operation of the lamp and to maximize its life. Three voltages are required to ignite an arc lamp and to bring it up to full and sustained operation: (i) a momentary high voltage RF pulse in the order of 10 to 50 kilovolts, applied across the two lamp electrodes (cathode and anode) and used to ionize the enclosed xenon gas; (ii) a momentary medium high voltage (called the open circuit voltage or plasma voltage) of the order of four to six times the nominal operating voltage of the lamp (e.g. 60 to 90 volts), applied across the lamp electrodes and which jumps the arc ga at the electrodes of the lamp at the moment that the high voltage gas ionizing pulse is applied across the lamp; and (iii) a low voltage, known as the sustainer voltage, of the order of 10 to 30 volts, applied across the lamp electrodes used to sustain the flow of the plasma after the open circuit voltage has been removed.

In prior art battery powered search lights, large high voltage transformers and storage capacitors have been required to generate a high voltage pulse of sufficient magnitude to fire the lamp spark gap. Further, these lights have required a separate voltage boosting circuit for generating the open circuit voltage, further adding to the size, weight, component count and complexity of the search light and its power supply circuitry.

It is well known that arc lamps place considerable current drain on the battery providing power to the lamp. As a result, frequent recharging of the battery is required. So far as it is known, prior art battery powered arc lamp type search lights always run at maximum light beam intensity, thus battery current drain is always at a maximum. A desirable feature in such a search light is to minimize this current drain and thus extend batter life. The present invention overcomes this disadvantage by providing to a normal or bright light mode of operation (with a low current drain) and a selectable alternate or brighter light mode of operation (with higher current drain).

As a battery life protection feature, it is desirable to detect low battery voltage and turn the light off before severe damage is done to the battery. However, if the light is so turned off, it is also desirable to provide an emergency override in case the user finds himself in a position requiring emergency light.

Ideally, a hand held search light should have a detachable battery for quick replacement and which can be detached from the light to reduce its weight. Thus, it can be seen that a need exists for a combination battery pack and hand held search light which enables the battery pack to be quickly released from the light and carried on a shoulder strap. This feature is advantageous when the light is to be carried for sustained periods. Such a feature further allows larger capacity battery packs to be carried when longer battery life is required. Further, it allows the battery pack to be quickly changed out without having to dismantle the light or remove any covers or caps from the light.

The safe mounting of xenon arc lamps in hand held search lights has always been of major concern to manufactures and users of such lights. Because these lights are subjected to dropping, and resultant shock, the lamp can explode if it is rigidly mounted in the light. Thus, a need exists for a means to shock mount an arc lamp which minimizes the possibility of such explosions. Resident with this shock mounting is the need to provide a means to remotely focus the light beam and to center the beam in the focal plane of the light without disrupting the shock mounting.

Further, it is desirable that any combination shock mounting, focusing, and centering mechanism be designed such that an inexperienced person can replace the lamp without fear of explosion and adjust the lamp without fear of injury by exposure to high intensity light (ultra violet) from the lamp after its replacement.

I have found that prior art arc lamp type search lights are not designed to maximize the amount of light collected and emitted by the lamps reflector or mirror. Thus, in order to achieve a satisfactorily bright light, it has been necessary to use a large lamp with attendant large power supply and battery. I have discovered an improved combination of mirror and arc lamp design which at least doubles the mirror light collection efficiency, thus enabling my search light to generate much more light with less power consumption than prior art lights using comparable voltage arc lamps.

Various types of spotlights and search lights, some of which use arc lamps and which disclose lamp focusing and mounting mechanisms and circuits for operating such lights, are disclosed in U.S. Pat. Nos.: 3,746,920; 3,675,078; 1,286,590; 1,291,483; 3,201,580; 4,240,009; 1,369,892; 3,689,759; 4,499,525; 1,825,354; 4,634,936; 2,982,881; 4,121,136; 4,782,432; 4,787,022; 4,317,162; 4,533,984,; and 4,450,508.

OBJECTS OF THE INVENTION

It is, therefore, an object of the invention to provide a hand held search light and system having enhanced structural and operational features and capabilities.

Another object of this invention is to provide a search light of the above mentioned type which is locally or remotely operable.

A further object of this invention is to provide a search light having a mount for shock mounting an arc lamp.

An additional object of this invention is to provide a search light wherein an arc lamp may be easily replaced, shock mounted, focused, and centered.

A still further object of this invention is to provide a search light wherein an arc lamp may be replaced and the light adjusted and tested without exposing the light operator to the dangers of ultraviolet light or lamp explosion.

Yet another object of this invention is to provide a hand held search light wherein a battery pack may be quickly detached from the light and carried by a shoulder strap.

Another object of this invention is to provide a hand held search light which can be switched from at least a low beam to a high beam.

A still further object of this invention is to provide a battery powered search light capable of automatically turning the light off on low battery voltage and having an operator controlled override for turning the light back on.

An additional object of this invention is to provide a hand held search light having electronic circuitry therein for controlling all operations of the light.

Yet another object of this invention is to provide a hand held light weight arc lamp type search light having miniaturized transformers and components contained in a circuit in the search light for controlling the focusing, ignition, and operation of the arc lamp and the light.

It is another object of this invention to provide a hand held search light having lenses which can be stacked or interchanged to alter the light emitted by the light.

It is yet another object of this invention to provide apparatus and methods of changing an arc lamp in a search light, igniting and operating the lamp, and centering and focusing the beam emitted by the light.

It is a further object of this invention to provide a search light having improved light collector efficiency.

SUMMARY OF THE INVENTION

In one aspect of the invention, a hand held search light is provided with a first housing which contains a reflector or mirror therein with a lens mounted over the clear aperture of the mirror. The housing provides therein a single support to mount, adjust, and focus an arc lamp which is suspended at opposite ends thereof inside the housing between the lens and the support. The arc lamp is spring biased at its lens end and supported at its other end in a clip in the support to shock mount the arc lamp at at least one end thereof.

The support is adjustable whereby the arc lamp may be moved against the spring bias, along its axis (Z axis) to focus the beam spread of the reflected light emitted by the mirror.

The support also provides the capability to adjust the arc lamp along X and Y axes (perpendicular to its Z axis) to enable centering of the light beam in the mirror and lens. Advantageously, all centering is accomplished external of the search light and the housing after installation of the arc lamp.

The arc lamp and the search light mirror are designed and oriented with respect to one another, such that maximum light, from the lamp electrodes, is collected by the mirror, to thus increase light emission from the search light.

In a further aspect of the invention, a second housing is provided for attachment to the first housing and contains therein a miniaturized control circuit for controlling the operation of the arc lamp and the focusing of the beam spread of the light.

An electronically controlled servo in the second housing communicates with a focus means in the first housing to enable selective focusing of the light beam by a lamp operator when the housings are joined together.

A quick disconnect means on the first and second housings provide means for automatically making the necessary power connections to the arc lamp electrodes and the control circuitry when the housing are secured together.

The electronic circuitry is connected across the electrodes of the arc lamp and contains at least a high voltage igniter and voltage or current regulator which at least; (i) generates and controls the application of open circuit voltage to the arc lamp; (ii) provides a high voltage pulse to the lamp to effect ignition of the lamp; (iii) controls and limits the peak in rush current to the lamp upon ignition; and (iv) after ignition, controls the magnitude of the sustaining voltage and current for the lamp to maintain the operation thereof.

As another aspect of the invention, a carrying handle on the second housing contains touch type controls to enable an operator to focus the search light, turn the light on and off and control the intensity of the light. Means are also provided in the handle to enable the operator to override an automatic low battery voltage lamp cutoff means in the control circuit to turn the light back on.

The carrying handle also contains a quick battery release means which co-operates with a detachable battery pack on the bottom of the second housing to allow quick battery pack change out, or release of the battery pack so that it may be carried by a shoulder strap attached to the batter pack.

BRIEF DESCRIPTION OF THE DRAWINGS

The foregoing objects, advantages, and features of the present invention may be more readily understood by one skilled in the art with reference being had to the following detailed description of the several preferred embodiments thereof, taken in conjunction with the accompanying drawings, in which:

FIG. 1 is a perspective view of the search light of the present invention and illustrating the relationship of the detachable battery pack to the light.

FIGS. 2A, 2B, and 2C are side views, partially in cut away, of the search light and the battery pack of the present invention illustrating how the light and battery pack are attached and released by use of a release mechanism in the handle of the search light.

FIG. 3 is a sectional view taken along lines 3—3 of FIG. 1.

FIG. 4 is partial cut away side view of a spring biased mounting on the arc lamp of the present invention and as shown at 4 in dot dashed lines in FIG. 3.

FIG. 5 is a top view of the controls in the carrying handle of the search light of the present invention.

DESCRIPTION OF THE PREFERRED EMBODIMENTS

Figures 6, 7, 8:
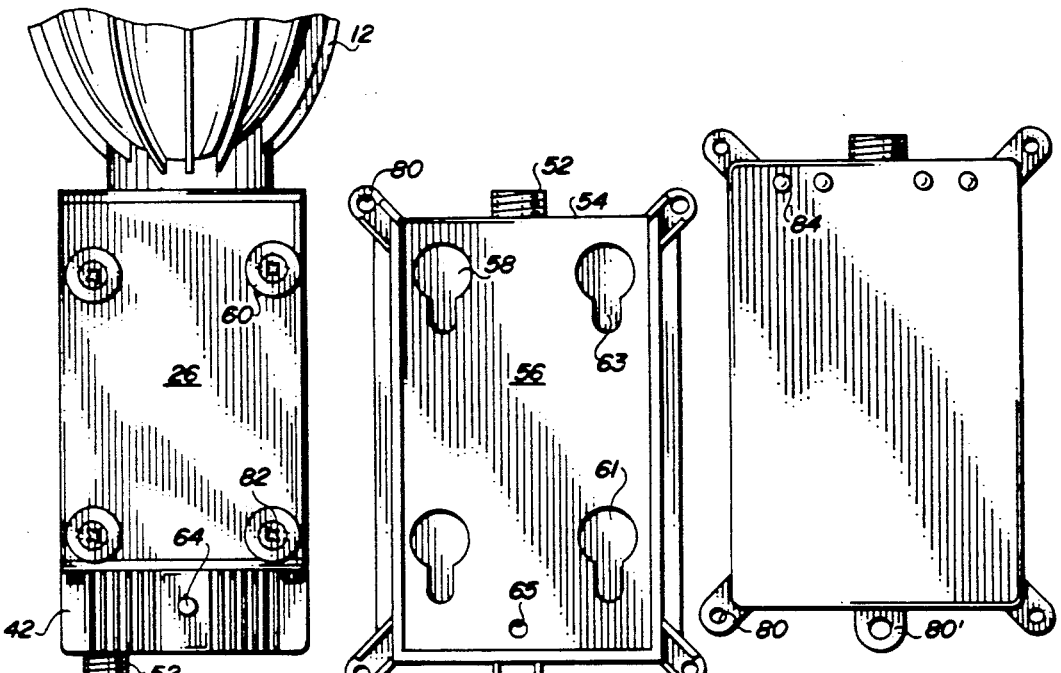
FIG. 6 is a bottom view of the search light of the present invention.
FIG. 7 is a top view of the battery pack of the present invention.
FIG. 8 is a bottom view of the battery pack of the present invention.

Referring now to the drawings, wherein like reference numerals are used throughout, and in particular to FIG. 1, there is illustrated a perspective view of a hand held search light 10 in which the various features of the present invention are found. The light is a ruggedized design and is preferably formed of cast or extruded high impact aluminium parts or high impact plastics such as "LEXAN" polycarbonate. A first conically shaped housing 12 forms the front of the light and includes a reflector or mirror 14 for emitting light out a clear aperture 16 covered by a lens and locking ring assembly 18 which is secured to the front of the light with screws 20. The light which is emitted by the mirror 14 is generated by an arc lamp such as a xenon gas filled lamp 22 having certain features to be subsequently described.

The housing 12 has a flange portion 24 on its rearward end or vertex end, which is secured to a second housing 26 by a plurality of screws 28. The housing 12 also contains, around its outer periphery, a plurality of ribs 30 which extend longitudinally from the front of the housing to the rear of the housing. The ribs 30 perform two functions in the light, the first of which is to provide additional rigidity or strength to the light, and the second is to serve as radiating fins or as a heat sync to radiate heat generated by the light 22.

The second housing 26 serves as a main body for the lamp and contains the necessary control circuitry and power supply circuitry for operating the arc lamp 22 and for focusing the lamp.

Portability of the light is advantageously accomplished by the implementation of a carrying handle 34 which is secured to the top side of the main housing 26 by a plurality of screws 36. The handle 34 is of a two-piece construction held together by a plurality of screws 36. Advantageously, for ease of operation of the light the handle 34 also includes in the front portion thereof a push button switch 38 for turning the light on and off and a multi-function switch 40 which is moveable along two axes as shown in FIG. 5 to control the focusing of the lamp and switching the lamp between a high and a low beam.

A third housing 42 is secured by a plurality of screws 44 to the rearward end of the main control housing 26. The housing 42 also contains radiation or stiffening fins 46 and includes a power input receptacle 50 for providing power to the circuitry within the housing 26. As will subsequently be described, the housing 42 also serves to firmly secure a control circuit board inside the housing 26 to form a circuit module which serves to make the search light easy to maintain.

Still referring to FIG. 1, power is provided to the light 10 via an extendable power cord 48 having a connector 51 on each end thereof. The power cord 48 is attached to the plug 50 on the light and to a suitable plug receptacle 52 on a battery pack 54.

The battery pack 54 is preferably made up of a high impact strength plastic, such as a "LEXAN" polycarbonate which is molded to contain a battery (not shown) which is connected to receptacle 52 for providing the necessary energy to the lamp 10.

Figure 9:
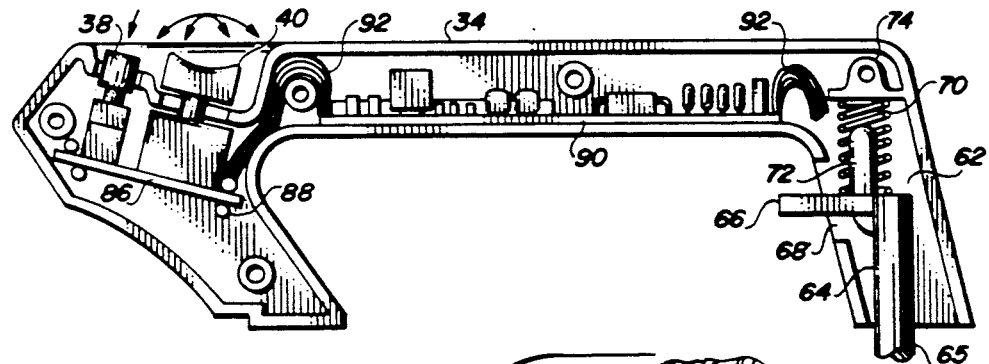
FIG. 9 is a sectional view of the handle of the search light of the present invention illustrating the placement and structure of the components internal thereto.

Advantageously the battery pack 54 contains an integral top 56 which is molded to the case of the battery pack after installation of the battery. There are four substantially tear drop shaped or elongated slots 58 formed in the top 56 to provide a means for attaching the battery pack to the light 10. As shown in FIGS. 1 and 2, these slots 58 are formed to receive four matching feet 60 forming an integral part of the lamp 10 and shown as being attached to the bottom side of the control housing 26. An integral part the battery pack attaching means includes a trigger or finger operated lever mechanism 62 the details of which are better shown by FIG. 2c. Further details of release mechanism 62 are also shown in FIG. 9. As shown in FIGS. 2c and 9 the release mechanism 62 is comprised of a plunger or pin 64 slidingly mounted in an aperture 65 in the rearward end of the handle 34. As can be seen, the pin 64 extends downward through the handle, through housing 42 (FIG. 3), and extends out the bottom end thereof to engage a hole 67 suitably formed in the top 56 of the battery pack 54.

The pin 64 also has a release trigger 66 formed on the top end thereof which protrudes through a slot 68 formed in the rearward end of the handle 34 (FIG. 9.). As best shown in FIG. 9, the release mechanism 62 is spring bias by a coil spring 70 which is held in place by a pin 72 formed on the top of the trigger release 66. Spring 70 is fitted over the pin 72 and is compressed between the top side of the trigger release and a boss 74 to provide downward pressure on the release pin so that it normally protrudes out the bottom side of the housing 42.

To understand how the battery pack is attached to and released from the light reference is now made to FIGS. 2a, 2b, and 2c. FIG. 2a illustrates the relationship between the battery pack 54 and the light in preparation for attaching the light to the battery pack. As shown, the feet 60 are positioned to be in alignment with the larger or oval portion 61 of the elongated slots 58. It should also be noted that the pin 64 is protruding from the bottom of the housing 42. FIG. 2b illustrates the actions required to insert the foot 60 into the slot 58 as shown by a downward arrow labeled 1. As can be seen, FIG. 2b, there is a small slot or space 76 formed in the top 56 to enable the foot 60 to slidingly engage into the narrow end 63 of the slot 58. To attach the battery pack to the light, an operator using his finger, lifts up on the trigger 66 (see arrow 5 in FIG. 2c) and then slides the handle 10 backward into the narrow part 63 of the slot 58 (as shown by arrow 2) to bottom out the foot in the narrow portion 63 of slot 58. Once the foot is fully engaged, or bottomed out, the operator then releases the trigger 66, which allows the pin 67 to now engage the hole 65 in the top 56 of the battery pack. The battery pack is now locked in place and prevented from moving in either direction with respect to the light by three shoulders 69 on the top of the battery pack and further by the locking engagement of the feet 60 in slots 58 and the pin 64 in hole 67. To detach the battery pack from the light, the above described operation is merely reversed. That is, the operator lifts up on the trigger 66, slides the handle forward into the larger portion 61 of slot 58 and separates the light from the battery pack by merely lifting up on the light. FIG. 2c illustrates this latter operation to unlock or separate the battery pack from the light as shown by the arrowed lines 3 and 4.

As previously described, the battery pack can be detached from the light to lighten the carrying load of the light by the provision of a carry strap 78 which can be suitably attached as shown in FIG. 1 to any of five connecting eyes 80. The extendable cord 48 provides the further advantage that the light, once detached, can be moved around by the operator without being restricted.

Further details of the relationship between the light and the battery pack are shown in FIGS. 6 and 7. FIG. 6 is a bottom view of the lamp showing the housing 26 and the feet 60 mounted thereon by suitable attaching screws 82. FIG. 7 shows a top view of the battery pack and illustrates an additional eyelet 80' forming part of the battery pack and serving as an additional attaching point for the carry strap 78.

FIG. 8 shows additional details of the battery pack by illustrating in the bottom side thereof four small conductive pins 84 which are connected internally to the battery in the battery pack and are used to make contact with a battery charger of the drop-in type. It is contemplated that the invention will be used in applications, such as police cars, where it is desirable to be able to drop the battery into a charger and charge it when it is not being used. These small conductor pins are designed to align with a suitable charger to make the necessary contact to charge the battery while the patrol car is in transit and the light is not in use.

Reference is now made to FIG. 9 for a further detailed description of the handle 34. FIG. 9 is a cutaway side view of the handle showing the placement of the various components thereof. As shown, the on/off switch 38 and a multifunction switch 40 are mounted to a stiff circuit board or plate 86. As shown, plate 86 is mounted in snug relationship between four bosses 88 formed in the handle. As previously described, the on/off switch 38 is a normally open push button type switch which may be thumb operated by the operator. The action of switch 40, as shown by the arrows on FIGS. 5 and 9, is a rocker type multi-function switch which can also be thumb operated by an operator by moving or rocking the switch forward and backward or side ways on two different axes. As shown in FIG. 5, when the switch is pushed to the forward position it causes the focus mechanism of the light to change the beam spread from spot to flood. If the switch is moved in the reverse direction it causes the focus mechanism of the light to change the beam spread from flood to spot. Switch 40 is also used to control the intensity of the light beam by the operator moving the switch from left to right as shown in FIG. 5 to switch the intensity of the light beam from high to low. The manner in which this is accomplished will be subsequently described in connection with the description of the control circuit which is housed within the housing 26.

FIG. 9 also shows a circuit board 90 mounted within the handle and which contains a servo controller 366 (FIG. 13) for controlling a servo mechanism 370 which is mounted as a part of the control circuit on board 94 in the housing 26. The manner in which the servo controller functions to control the servo 370 will be subsequently described. It will also be noted that a plurality of wires 92 are routed from the switches 38 and 40 and from the controller 90 through the handle 34 and out the bottom end thereof into the housing 26 via the rear housing 42 where those wires are connected to the circuit board 94 contained within the housing 26. The routing of these wires is shown in FIG. 3.

While the embodiment shown in FIG. 9 shows the servo controller 90 as being contained on a circuit board within the handle 34 is it to be understood that the controller can also be contained as an integral part of the control circuitry contained on circuit board 94 within housing 26.

Reference is now made to FIG. 3 which shows a cutaway side view in cross section taken along lines 3—3 of FIG. 1 illustrating further details of the structure of the search light of the present invention. As shown in FIG. 3, a circuit board 94 contains all of the necessary components making up the control circuit for operating the light and includes a servo 96 which functions to focus the light when the switch 40 on the handle 34 is activated. The servo 96 contains a shaft driven wheel 98 which rotates in a clockwise and counter clockwise direction as shown by the arrow on the wheel 98. The servo wheel 98 has attached thereto a focus shaft 100 mounted such that the shaft operates on a concentric to move the shaft 100 longitudinally along its axis with rotation with the wheel 98. It is this longitudinal movement of shaft 100 which focuses the lamp. A detailed description of the focus mechanism and its relationship to shaft 100 will be subsequently described. Included on the shaft 100 is a small tension spring 102. Spring 102 is disposed on the shaft between an adjustment nut 104 and a shoulder 106 forming part of a cylindrical tube 108 which telescopically slides over shaft 100. The combination of the nut 104 spring 102, and shoulder 106 serve to provide the proper amount of pressure of the shaft against the focus mechanism in the lamp. The manner in which this tension is retained against the focus mechanism will subsequently be described. The shaft 100 and its focus travel is adjustable by threads on shaft 100 which thread into an eccentric adjustment 110 attached to the wheel 98 by a suitable attaching means such as a screw 112.

It is also significant to note that the circuit board 94 is rigidly secured to the housing 42 by four screws 114, of which only two are shown. The screws are threaded through the housing 42 into two metallic blocks (not shown) which are securely attached to the circuit board to make the circuit board and the housing 42 a rigid one-piece structure. The circuit board also has a mounting block 116 secured thereto and which contains a hole 262 through which the focus shaft 100 passes. This mounting block 116 also contains all of the necessary terminal connecting points for making a quick disconnect of the control circuit to the lamp head. Details of block 116 will be more fully described in connection with a description of FIG. 10.

Still referring to FIG. 3, a lamp focus and mounting mechanism shown generally as 117 is illustrated in a side view. The lamp 22 is shock mounted through the center focal plane of the lamp by being disposed at opposite ends thereof. One end of the lamp passes through an aperture 118 located in the apex end of the mirror 14 and conical housing 12. Sufficient clearance is provided in the aperture so that lamp 22 may move longitudinally along it axis as shown by the arrow on the lamp. The lamp is plugged into a high conductive spring clip type socket 120, preferably made of beryllium. A brass bushing 122 or connector on socket 120 passes through an aperture in a hub 124 which houses the socket 120. The bushing 122 serves as a connector for connecting a conductor or wire 126 to the electrode at the lamp 22.

As can be seen in FIG. 3, the hub 124 telescopically slides inside a second hub 128. A coil spring 130 is disposed around hubs 124 and 128 and rides at opposite ends thereof against a shoulder 132 of hub 124 and a shoulder 134 on hub 128. Spring 130 provides rearward spring tension against hub 124 to thus cause the hub to move to the left and keep tension on the focus mechanism in a manner to later be described.

The front end of the lamp 22 is shock mounted in a telescopic mounting mechanism 136 which has a narrow tip 138 nested in a button 140 forming a part of the lens 18. The details of the lamp mounting mechanism 136 are shown in FIG. 4. Mounting means 136 is basically comprised of three parts, a tubular conductor 142 affixed solidly to the lamp and connected to one of the electrodes of the lamp, a telescopic member 144, which contains tip 138, and which telescopically slides inside the tube 142. A spring 146 fits within the tube 142 and the member 144 to provide spring tension to hold the lamp in place by exerting pressure against a shoulder (not shown) on each end of the member 144 and the tube 142 to thereby force the lamp rearward toward the focus mechanism 117.

The lamp focus and mounting mechanism of the present invention provides many attendant advantages. In the past, the accepted procedure for supporting the front of an arc lamp in a light of the type contemplated by the present invention has been to utilize a two or three pronged spider support across the open end of the light to support the lamp. The legs of this spider type of support obstruct a portion of the light output, breakup the light beam and thus reduce the light's efficiency.

A major drawback to the spider type of lamp support is that it is a rigid mount tending to induce stress on the lamp. This type of lamp support also further complicates the replacement lamp process, and makes it difficult and dangerous to calibrate or center the light beam after lamp replacement. To make this calibration, the lens must be removed so that the spider can be adjusted to move the lamp and thus center the beam. This danger is brought about by the fact that, during lamp change out, if any stress is applied to the lamp it can explode. Also, once the lamp has been installed it requires that the installer ignite the lamp, with the lens removed, in order t complete the centering and focusing adjustments for the light. While making these adjustments, the installer must have direct access to the lamp which expose the installer to a very hazardous situation. These hazards consists of exposure to high voltage, ultra violet, and the possibility of lamp explosion. As will be explained, my light design overcomes these hazards by providing a lamp support and focus mechanism which makes it simple and safe for an unskilled operator to replace the lamp and adjust and operate the light.

As can be seen in FIG. 3, the method and apparatus of shock mounting the front of the lamp uses a spring biased telescopic mount having a tip 138 which rides in a recess in a button 140 formed in the protective lens cover 18. This spring biased mounting allows the front of the lamp to be free floating, inducing no bending, torsional or tensile stress on the lamp. Simplicity in the lamp front support design is achieved by using the lens cover as a support for the front of the lamp. Removal of the lens also removes the front lamp support by virtue of its design. The above mentioned developments, when combined, provide for a simple safe and fast method of performing a lamp change by an inexperienced operator. For example, the operator using a suitable screwdriver or other tool, need only remove the front lens 18, unplug the lamp, plug the new lamp in, replace the front lens, and refocus the lamp. As can be seen, the operator has never been exposed to the high voltage across the lamp or to ultra violet light during the lamp change or focusing process.

Another unique feature of my light resides in the manner in which I mount the lamp to gain maximum light collection efficiency by the mirror. I discovered, after studying the polar plot of the lamps output, that I could reverse the lamp, with its cathode and anode adjacent the mirror vertex and greatly increase the collection efficiency of the light. This was achieved by changing the shape of the lamp anode and cathode electrodes so that the polar plot of the lamp output coincides with the light collection angle of the mirror. I found that this greatly increased the luminous output of the searchlight to a level never before achieved in such a small compact light. This high efficiency was achieved as shown in FIG. 3 by installing the lamp 22 with its bulb portion 148, which contains the anode and cathode, close to the vertex of the mirror adjacent the aperture 118.

I found that the optimum focal length of the mirror occurs at approximately 0.400 of an inch from the vertex of the mirror along its longitudinal axis toward the clear aperture end of the mirror. I designed the shape of the anode and cathode such that the light output from the plasma ball (arc between the anode and cathode) strikes the mirror at the proper angle to achieve maximum collector efficiency and thus deliver maximum light output from the mirror.

Referring now to lamp 22, a second wire 150 is connected from a terminal on block 116 and routed through the housing 12 and connected to the lamp by a spring clip 154 at the anode electrode 136. It should also be noted that a small hole 156 is formed in the mirror toward its open end to route the wire 150 therethrough for connection to the lamp.

Still referring to FIG. 3, it will be noted that a small circular gasket 158 resides between the housing 12 and the mounting flange or ring 160. Ring 160 contains the lens 16. The gasket 158 serves to prevent dust, moisture, and other contaminants from affecting the efficiency of the mirror. Preferably, the mirror is secured in the housing 12 by the use of a high temperature cement. Further, the mirror is held in place by the mounting flange 160 of the lens 18 when the lens is securely attached to the clear aperture end of the mirror. This secure attachment is provided by a shoulder 162 on the mounting flange 160 which rides against the outer periphery of the mirror.

Reference is now made back to FIG. 1 in conjunction with FIG. 3. In FIG. 1 the lens mounting ring 160 contains locking grooves 164 which are designed for mating attachment to an additional mounting ring as shown in FIG. 3 by the numeral 166. Additional mounting ring 166 contains a plurality of interlocking tabs 168 suitably positioned around the periphery thereof to mate with the locking grooves 164 on the mounting ring 160. The locking rings, as can be seen, are fashioned such that when the tabs 168 are inserted into the wider portion of the locking grooves 164 and the auxiliary mounting ring is rotated in a counter clockwise direction the tabs 168 interlock to ring 160 thus locking the auxiliary lens 166 in place over the clear lens 18. This feature of the present invention allows one ring to be attached to another ring to, thus allow the rings to be stacked on top of each other. As can be seen, these rings snap lock into place, thus providing a quick disconnect and connect means to simplify field use of the light. By installing different beam conditioning lenses in auxiliary rings, it provides the user with ability to alter the beam output of the light to suit his immediate needs. For example, infrared filters, colored lenses, beam spread lenses, or any combination of these different lenses can be snapped into place and used individually or jointly.

Figure 10:
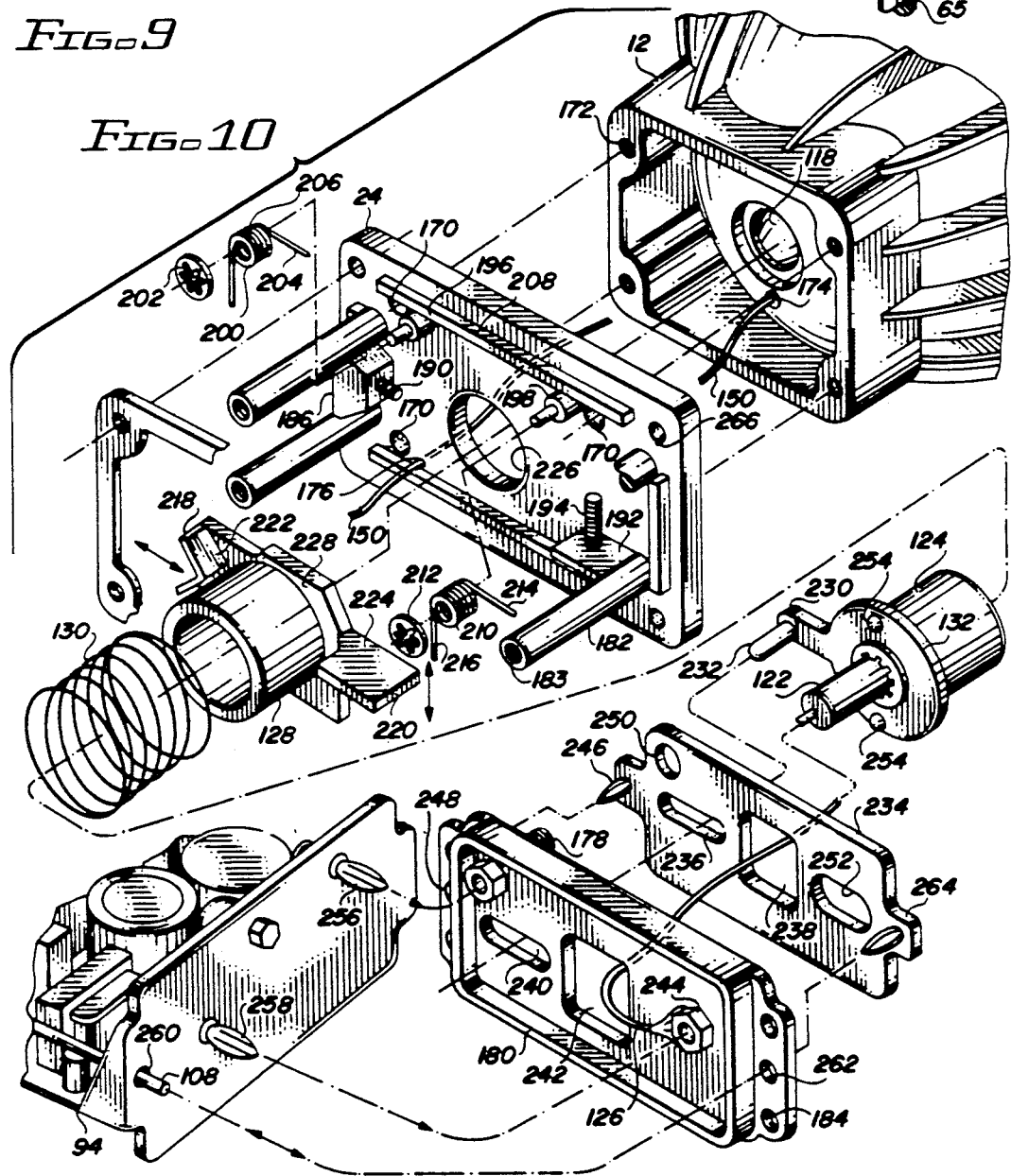
FIG. 10 is an exploded perspective view illustrating the arc lamp focusing and support features of the invention. Also illustrated is a quick disconnect feature by which the electronic control circuit is connected to the arc lamp and the focusing support mechanism of the invention.

Reference is now made to FIG. 10 which illustrates the details of the interrelationships of the various component parts making up the apparatus of the lamp focus and centering mechanism of the present invention. As shown, the previously mentioned mounting flange 24 is designed to be mounted on the housing 12 by four screws (not shown) which are inserted through four holes 170 formed in the flange and which get screwed into corresponding holes 172 in the rear of housing 12. The anode wire 150 is routed through a hole 174 which is formed in the vertex area of the housing 12 and then routed through an additional hole 176 in flange 24. The wire 150 is connected to a quick disconnect terminal 178 on a terminal mounting plate 180.

The flange 24 preferably is of a one-piece cast construction, such as aluminium, and contains four mounting posts 182 each having threaded holes 183 in one end thereof. The mounting posts 182 serve to assemble the complete focusing mechanism by attaching the terminal mounting plate 180 to the posts 182 by the use of four screws (not shown) which pass through mounting holes 184 on the terminal mounting plate 180. The flange 24 also includes a first adjustment block 186 which has a small screw 190 threaded therethrough for use in adjusting the lamp 22 along one axis (X axis) when the light beam is being centered in the reflector. A second adjustment block 192 is also provided on flange 24 and similarly contains a screw 194 threaded therethrough for further adjusting the lamp 22 along another axis (X axis).when centering the beam. Two spring retainer bosses 196 and 198 are also included on the flange 24. A coil spring 200 is slipped over the retainer boss 196 and held in place thereon by a spring retainer clip 202 which is slipped over a small tip on the end of the retainer boss. The spring 200 contains two arms 204 and 206. When spring 200 is in place on boss 196, arm 206 rides between the boss and a shoulder 208 which extends lengthwise across the topside of the flange 24. The position of arm 206 will later be described.

A second spring 210 is fitted over the spring retainer boss 198 in a similar fashion to that just described for spring 200 . Spring 210 also contains two arms 214 and 216. When spring 210 is assembled on boss 198, arm 214 rides between boss 198 and shoulder 208 in a manner similar to that just described for spring 200. A retainer clip 212 is also provided to hold spring 210 on boss 198 by slidingly engaging the clip over the small tip end of boss 198.

Figure 11:
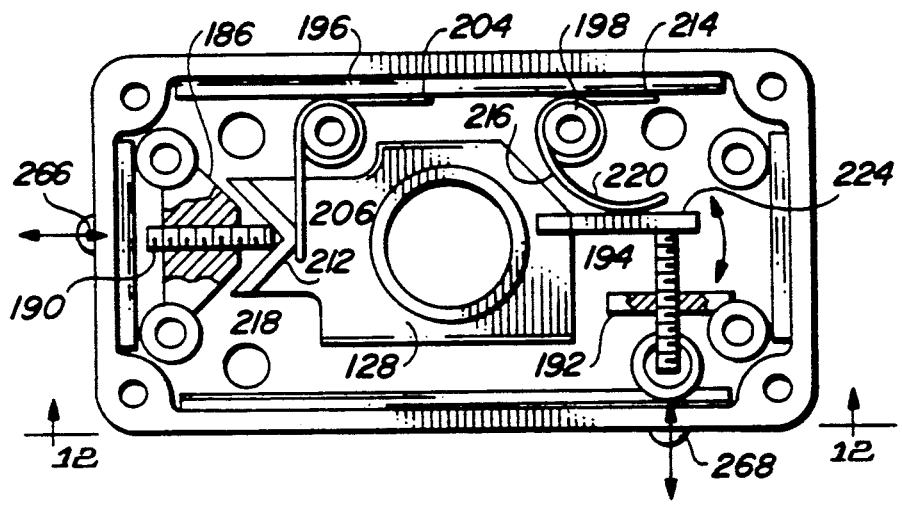
FIG. 11 is a rear view of a portion of the lamp support showing a feature thereof for centering the light beam of the search light of the present invention.

The previously mentioned centering hub 128 is shown in FIG. 11 and contains two adjusting flanges 218 and 220 which extend outwardly perpendicular to the horizontal axis of the hub 128. As can be seen, the flange 218 is of a V shape and is designed such that, when the hub 128 is assembled next to the flange 24, the tip of the screw 190 is nestled into the vertex or V portion of the flange 218. The adjusting flange 220 is in the form of a relatively flat tab which, when hub 128 is assembled adjacent to the flange 24, the tip of the screw 194 rides on the bottom side of the flange 220. When the hub 128 is in position, as just described, then the arms 206 and 216 of the springs 200 and 210 are compressed whereby the arm 206 rides on the backside of the V portion of flange 218 as shown at 222. In a similar fashion the arm 216 rides on the topside of the tab of flange 220 at a location shown as 224 (see FIG. 11 for further details).

As can be seen, with the two springs 206 and 210 in place applying pressure against the respective flanges 218 and 220 and thus against the tips of the two screws 190 and 194, the hub 128 is held firmly in place and can be adjusted along the x and y axes to center the hub with respect to the horizontal axis of the aperture 118 in the housing 12 and further with respect to axis of aperture or hole 226 in flange 24. Still referring to FIG. 9, the previously mentioned coil spring 130 is disposed over the hub 128 whereby one end of the spring rides against a shoulder 228 on hub 128 and the other end of the spring rides against the previously mentioned shoulder 132 on the focusing hub 124.

The focusing hub 124 has formed on the shoulder 132 a tab or member 230 which extends outwardly perpendicular to the horizontal axis of the hub 124. Member 230 also has formed thereon a small boss or guide pin 232 which extends perpendicularly outward from tab 230 and is aligned parallel with the longitudinal axis of the hub 124. The tab 232 and the terminal 122 on the lamp socket 120 are configured such that, when the hub 124 is nestled against a focus plate 234, tab 232 and terminal 122 pass through a slot 236 and a rectangular hole or opening 238 respectively formed in the focus plate 234. As can be seen, the tab 232 and the terminal 122 pass through slot 236 and opening 238 and further enter into a slot 240 and an opening 242 on the terminal mounting plate 180. The tab 232, extending through slots 236 and 240 serves to prevent the hub 124 from rotating when the focus plate 234 is actuated by rod 108 to move the hub 124 to focus the lamp 22.

It will also be noted that the wire 126 which is secured to the bushing 122 is routed through holes 238 and 242 whereby wire 126 is secured to make the cathode connection for the lamp at an additional quick disconnect terminal 244 located on the terminal mounting plate 180.

Referring now back to the focus plate 234, it will be noted that a small hinge pin or pivot pin 246 is formed on the backside of focus plate 234 and extends outwardly therefrom to enter into a small hole 248 formed in one end of the mounting plate 180. It should also be noted that a hole 250 is formed in plate 234 to loosely fit over one end of the terminal 178. During assembly of the focus mechanism, the focus plate 234 is first nestled against the plate 180 with hole 250 sliding over the terminal 178 and with the tab 246 positioned in the hole 248. After the plate 234 is in place, the wire 150 is soldered to the end of the terminal 178. It should also be noted, that an additional slot 252 is formed in plate 234 and is positioned to loosely slide over one end of the terminal 244 (the end not being shown) when the plate 234 is in position against the mounting plate 180. Pin 246 serves as a pivot point at one end of the focus plate 234. As the plate 234 is moved at its opposite end by the pushing action of the servo rod 108, plate 234 pivots about pin 246 to thus allow plate 234 to move freely back and forth against the focus hub 124.

Reference is now made back to the focusing hub 124 wherein there is shown on the backside of the shoulder 132 two small tabs or tips 254 formed thereon. These two tabs 254 are position such that they hold the hub 124 slightly away from the front side of the focus plate 234 such that, when the focus plate 234 is moved back and forth by the actuation of the servo rod 108, the tips 254 slide on the surface of plate 234 and the hub 124 remains centered within the center axis of the openings 242, 238, to thus retain the light centered within the aperture 118 of the housing 12.

Still referring to FIG. 10, reference is now made to the mounting block 116 forming a part of the circuit board 94. As shown, the mounting block 116 provides a portion of the quick disconnect means for connecting the circuit board 94 to the front housing of the lamp via the focusing mechanism. This means is provided two banana plugs or quick disconnect means 256 and 258 which plug into the connectors 178 and 244 respectively. It will also be noted that the focusing rod 108 extends through a hole 260 whereby the focus rod 108 precisely aligns with and passes through a hole 262 in plate 180. As shown by the arrows in FIG. 10, the focus rod, at its tip, rides against a small tab 264 formed on one end of the focus plate 234. As the focus rod 108 moves horizontally along its axis, the focus plate 234 hinges around pin 246 to move the focus plate at the end 264 to thus move the lamp in and out by horizontally moving the lamp mounting hub 124 which contains the arc lamp 22 in the socket 120 embedded inside the hub 124.

Having described the various features and interrelationships of the component parts of the focusing and lamp mounting mechanism of the present invention, it can now be seen how the focusing mechanism, when completely assembled to the housing 12, makes up the complete major front housing assembly. This assembly makes it easy for an inexperienced person in the field to service the light. As best shown by reference to FIGS. 1 and 10, it can be seen how the entire assembly is mounted to the control housing 26 by use of the screw 3 and 28 which are passed through four holes 266 on the flange or mounting plate 24. As best shown in FIG. 3, when the housing 12 is attached and secured to the control housing 26 the entire focusing mechanism is nestled inside housing 26. The component parts are designed so that there is a precise alignment of the quick disconnect means 178, 256, 244, and 258 as well as precise alignment of the focusing rod 108 through hole 262 with tab 264.

Reference is now made to FIGS. 3, 10, and 11. As can be seen, the lamp socket 120, which resides in the housing 124 at the rear of the lamp, is designed such that, the lamp, when plugged into the socket 120, not only provides the electrical connection to the base of the lamp (cathode), but is also designed to allow the lamp to swivel in a manner eliminating any of the previously mentioned stress conditions which might cause breakage of the lamp. Further, by virtue of the design, the adjusting screws 190 and 194 may be adjusted external of the housing 26 along the x and y axes to allow the lamp and the light beam to be centered within the mirror. In the preferred embodiment, this external adjustment is accomplished by providing two small removal caps or screws 266 and 268 in the housing 26 directly in line with screws 190 and 194. These screws can be removed by the operator and he can then insert a screwdriver directly through the housing 26 to engage screws 190 and 194 to thus allow the centering of the lamp to take place without the risk of exposure to ultra violet light by having to look directly into the light beam as is required by the prior art devices.

In keeping with the modular design of the present invention, another attendant feature is the ability to be able to completely change out the electronic control assembly of the invention by the mere removal six screws which allows the entire assembly to be removed from the housing 26 and replaced with another electronic control assembly. This feature is best shown by FIG. 1 wherein the two front screws 36 on handle 34 are removed along with screws 44 on the housing 42. The removal of these screws allows the entire electronic control assembly, including the housing 42 to be slid out the backside of housing 26 and replaced with an operational circuit board and handle assembly. This feature further expedites the efficiency of field maintenance by untrained personnel.

Figure 12:
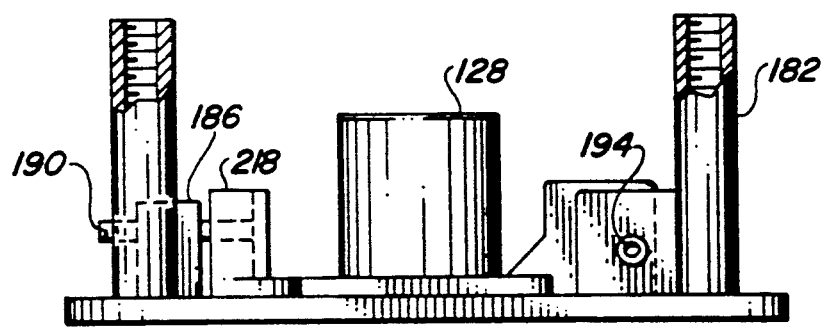
FIG. 12 is a side view of the support of FIG. 11 taken along lines 12—12.

For further clarity additional details of the light beam centering apparatus of the present invention can be found in FIGS. 11 and 12, as shown by the arrows in FIG. 11 which indicate the directional movement of the focusing mechanism.

Figure 13:
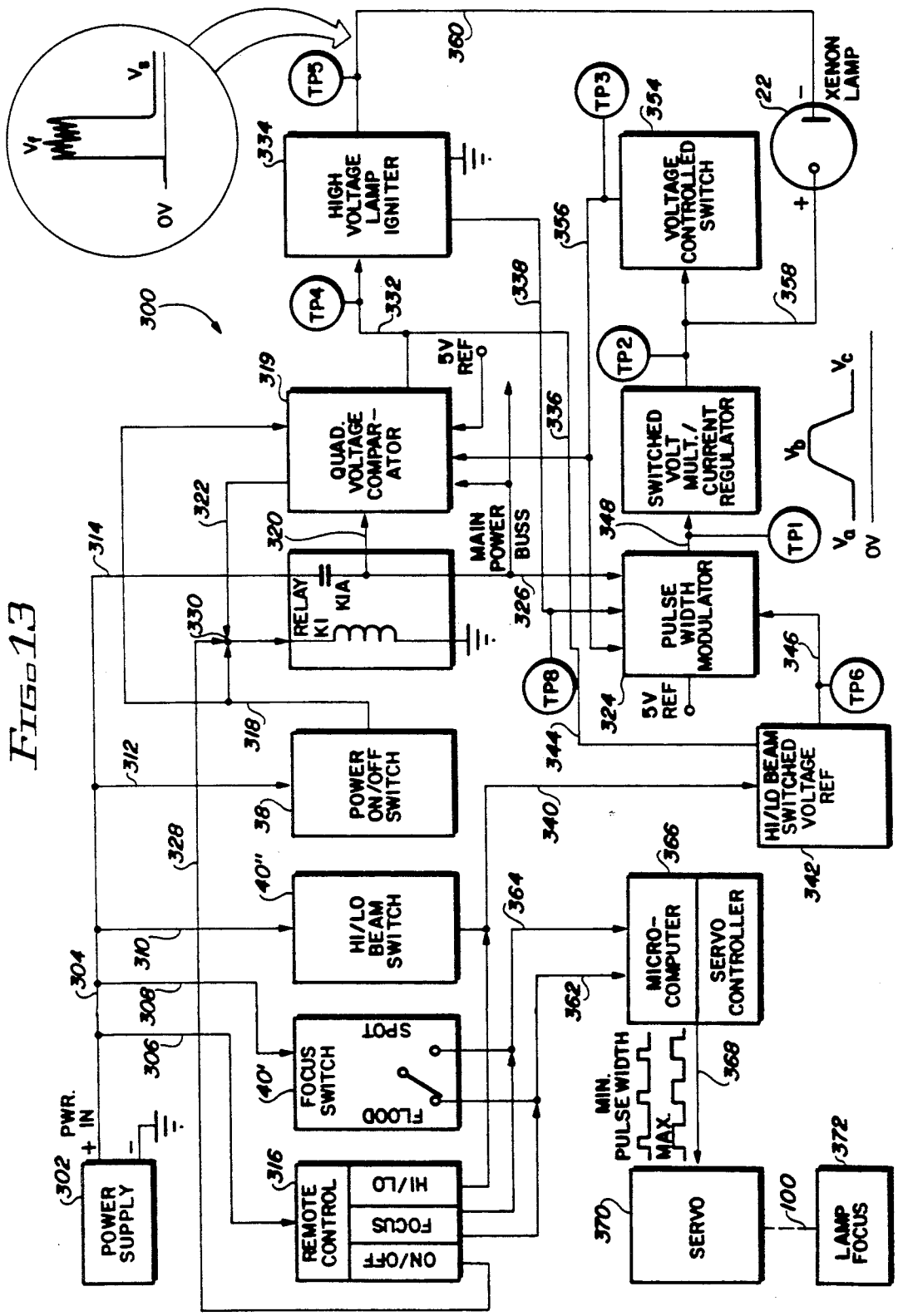
FIG. 13 is a schematic block diagram of the control circuit for operating the search light of the present invention.

Continuing with the description of the preferred embodiment, reference is now made to FIG. 13 which shows in block schematic diagram form the power supply and control circuitry for controlling the search light of the present invention and is generally designated as 300. A power supply 302 is provided for supplying DC current to the lamp circuitry 300. Power supply 302 may be a battery, such as battery pack 54 or any other suitable DC power supply. As illustrated, the power supply has its negative terminal connected to ground and its positive terminal provides a positive voltage on lines 304, 306, 308, 310, 312, and 314. Conductors 308 and 310 are connected to the focus switch 40' and the HI/LO beam switch 40" respectively. Switches 40' and 40", as previously described, are thumb operated and are located in the handle 34. The power on/off switch 38, also located in handle 34, receives its input power via the conductor 312. As previously described, one of the advantages of the present invention is that it can be controlled from a remote control source. To that end, a remote control 316 receives its input power via line conductor 306. It will be noted that the remote control 316 contains three switches, an on/off switch, a focus switch, and a HI/LO beam control switch. These switches function in same manner as do switches 40', 40", and 38.

When the light operator activates the switch 38 to turn the light on, 12 volts DC is provided to a power on/off relay K1 via a conductor 318. Conductor 318 is also connected to one input of a quad voltage comparator 319. Comparator 319 is an integrated circuit such as a LM339 of the type manufactured by Motorola Inc. Relay K1 is grounded, thus, upon application of a voltage on conductor 318 the relay energizes to close a set of normally open contacts K1A on relay K1. Upon closure of contacts K1A, the voltage on conductor 304 is applied via a conductor 320 to another input of the comparator 319. As soon as the comparator 319 receives the input voltage at its input from conductor 318 it provides a latching output of 12 volts on a conductor 322, to thus latch relay K1 in its energized position after the power on/off switch 38 has been released by the operator. The power is provided through contact K1A as one input to a pulse width modulator 324 via a conductor 326. The pulse width modulator 324 is an integrated circuit such as an SG3525 of the type manufactured by Motorola Inc. The voltage on conductor 326 also serves as the main power bus for the remainder of the circuitry. The main power bus is also connected as an additional input to the comparator 319 to provide operating voltage to the comparator. The comparator 319 also receives a 5 volt reference input from a voltage reference source.

Still referring to relay K1, it will be noted that that relay may also be energized from the remote control by the activation of the on/off switch contained therein. The voltage from the on/off switch in the remote control 316 is provided via a conductor 328 which is connected to the top of the relay K1 at connecting point 330.

The comparator 319 provides an output on a conductor 332 to the input of a high voltage lamp igniter 334. The pulse width modulator 324 receives an input from the lamp igniter 334 via a conductor 338.

Reference is now made back to the high/low beam switch 40", the output of which is connected via a conductor 340 as one input to a high/low beam switched voltage reference 342. A second input to the voltage reference 342 is provided on a conductor 344. Conductor 344 is connected to conductor 336 to provide voltage reference 342 with the same signal that is applied on conductor 332 to the high voltage lamp igniter 334. The switched voltage reference 342 has an output on a conductor 346 which is applied as a control input to the pulse width modulator 324 to control the duty cycle of the output pulses therefrom on a conductor 348.

A switched voltage multiplier/current regulator 350 receives the input signal on conductor 348 and serves to provide a controlled voltage, via a conductor 352, to the input of a voltage controlled switch 354. The voltage controlled switch 354 serves to provide a control signal, via a conductor 356, to an additional input of the comparator 319 and to the modulator 324.

It will also be noted that the output signal from the current regulator 350 is connected via conductor 352 and a conductor 358, to the anode of the xenon arc lamp 22. The cathode of the lamp 22 is connected, via a conductor 360, to a second output of the high voltage lamp igniter 334.

Reference is now made back to the focus switch 40' where two outputs therefrom, on conductors 362 and 364, are connected to first and second inputs of a conventional microcomputer such as a Motorola MC68705P3. The microcomputer serves as a servo controller 366 and is programmed to generate output pulses of varying widths on a conductor 368. The two inputs on conductors 362 and 364, upon activation of the focus switch between the spot and flood positions, will selectively effect the generation of pulses on conductor 368 as shown. These pulses are applied to a conventional servo 370 such as that manufactured by AirTronics under the number 94401. The servo 370 contains the necessary circuitry to convert its digital input pulses on conductor 368 to an analog output (at wheel 98) which is proportional to the digital values of the input signals. When the operator desires to change the beam spread of the searchlight from spot to flood he merely places the focus switch 40' into to the flood position. When this occurs the top pulses (narrow pulses) shown above conductor 368 are generated by the controller 366. These pulses cause the servo 370 to rotate in a clockwise direction to thus zoom the beam spread from spot to flood. In a similar manner, when the operator desires to zoom from flood to spot he merely places the focus switch in the spot position. This directs the microcomputer servo controller to generate the wider output pulses as shown above conductors 368. These pulses direct the servo 370 to rotate in a counter-clockwise direction and thus cause the lamp to zoom from the flood position to the spotlight position.

Figure 15:
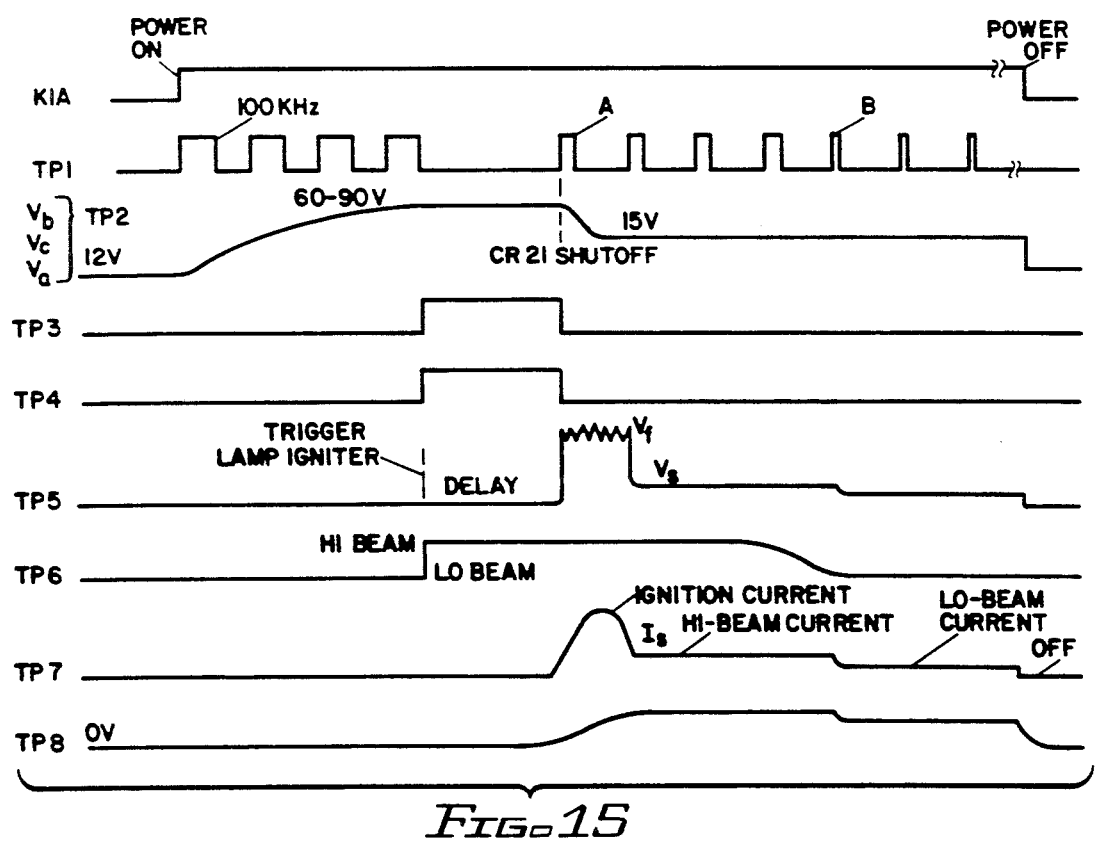
FIG. 15 is a timing diagram useful in understanding the operation of the control circuit of the present invention.

An operational description of the present invention will now be given by reference to FIGS. 13 and 15. FIG. 15 is a timing diagram showing various key test point or output signals TP1 through TP8 as shown in FIG. 13.

Let it now be assumed that the power on/off switch 38 has just been activated thus energizing and latching relay K1 and K1A. As soon as relay contact K1A closes, the signal on line 326 starts the pulse width modulator 324 generating output pulses at TP1 at approximately a 100 kilohertz rate. These pulses are applied to the voltage/multiplier current regulator 350 which responds by generating at TP2 a voltage on conductor 352 which ramps from 12 volts toward approximately 60 to 90 volts. When the voltage on conductor 352 (TP2) achieves a prescribed level (e.g. Approximately 65 volts), the voltage controlled switch 354 generates a pulse at TP3 which is applied on conductor 356 to the input of the quad voltage comparator 319 and the modulator 324. The instant that signal at TP3 is applied to the comparator 319, it generates an output signal as TP4 on conductors 332, 336, and 344. As noted in FIG. 15 the signal on conductor 356 quickly shuts off the pulse width modulator 324 thus killing the output pulses at TP1.

The instant that the TP4 signal goes positive on conductor 332, it causes the high voltage lamp igniter 334 to be triggered. Also at this instance, the signal at TP4 is applied to an input of the switched voltage reference 342 via conductor 344. This signal on conductor 344 now causes the switched voltage reference regulator 342 to generate at its output (TP6) a rapidly rising pulse which is applied as a binary 1 signal to the input of the pulse width modulator. This binary 1 signal prepares the modulator to generate output pulses at TP1 at a rate which will cause the light to automatically switch to high beam upon ignition.

It should be noted that the high voltage RF pulse at TP5 is not generated to ignite the lamp until a prescribed delay period has passed. That delay is effected by a circuit within the lamp igniter 334. This circuit is not shown in FIG. 13, but it will be described in connection with FIG. 14.

During the aforementioned delay period, the voltage on TP2 is applied to the anode of lamp 22. This voltage at TP2 is the aforementioned open circuit voltage and is applied as a first positive high magnitude to the lamp to cause the immediate heating of the lamp electrodes the instant that the high voltage RF pulse at TP5 is generated to fire the lamp.

The instant that the lamp fires (TP5), the signals at TP3 and TP4 drop to a binary 0 level. The signal on TP3 now enables the pulse width modulator 324 to again begin generating pulses at TP1 as shown at A of FIG. 15. The signal on TP3 causes the comparator 319 to go to a binary 0 to disable the high voltage igniter and to remove the high beam control signal on conductor 344 from the input to the switched voltage reference 342.

The instant that the lamp fires the output voltage at TP2 of the regulator 350 rapidly decays to a regulated 15 volt level. This is the normal operating voltage for the lamp. At this same instant, an ignition current pulse at a test point TP7 is generated. This pulse on TP7 is generated across a resistor R12 not shown in the lamp igniter circuit 334 of FIG. 13 but shown in FIG. 14A at the left hand bottom portion thereof. The manner in which the pulse on TP7 is generated will subsequently be described. However for the present suffice to say that the pulse on TP7 is the aforementioned inrush current through the lamp 2 at the instant point of ignition. This inrush current is rapidly diminished to a regulated current level Is under the control of the regulator 350 and the modulator 324 which monitors the lamp current on conductor 338, the monitored signal being shown at TP8.

The signal on TP8 controls the duty cycle of the pulses on TP1 from the pulse width modulator to thus control the output voltage at TP2 of the regulator 350.

As thus far described, the lamp is up and operating in its high beam current mode as shown by the amplitudes of the voltage and current signals, Vs on TP5, and Is on TP7.

After an approximate delay of two to three seconds, caused by a delay in the switched voltage reference 342, the output TP6 therefrom degenerates to a less positive level. When the signal at TP6 reaches its lowest level as shown in FIG. 15, the pulse width modulator is signaled to begin generating shorter pulses as shown at B of TP1. It can also be seen that the voltage levels of the current signals on TP7 and TP8 simultaneously decrease in amplitude. The magnitude of the voltage on TP8 now causes the duty cycle of the output pulses of the modulator at TP1 to change as shown at B to thus reduce current flow through the lamp and cause the lamp to automatically switch to its low beam normal energy conservation mode. The light will continue to operate in its low current beam mode until such time as the operator decides to switch from low beam to the high beam.

Reference is now to FIG. 13 to the HI/LO beam switch 40''. Let it now be assumed that the operator desires to switch from the low beam mode to the high beam mode. When the operator switches to high beam, the signal on conductor 340 goes to a high or binary 1 state causing the high/low beam switched voltage reference 342 to generate an output at TP6 which now rises to the previously described high beam level as shown at C in FIG. 15. When this occurs, the TP6 signal input to the pulse width modulator 324 now causes the modulator to again begin generating the pulses as shown at A in FIG. 15. These pulses (having the width A) will continue to be generated by the pulse width modulator at TP1 until such time as the operator decides to switch back to the low beam mode. When the operator returns to the low beam mode, the signal on conductor 340 drops, causing the signal at TP6 to return to the low beam level, and thus cause the modulator to change the duty cycle as shown at B of TP1.

Figure 14A:
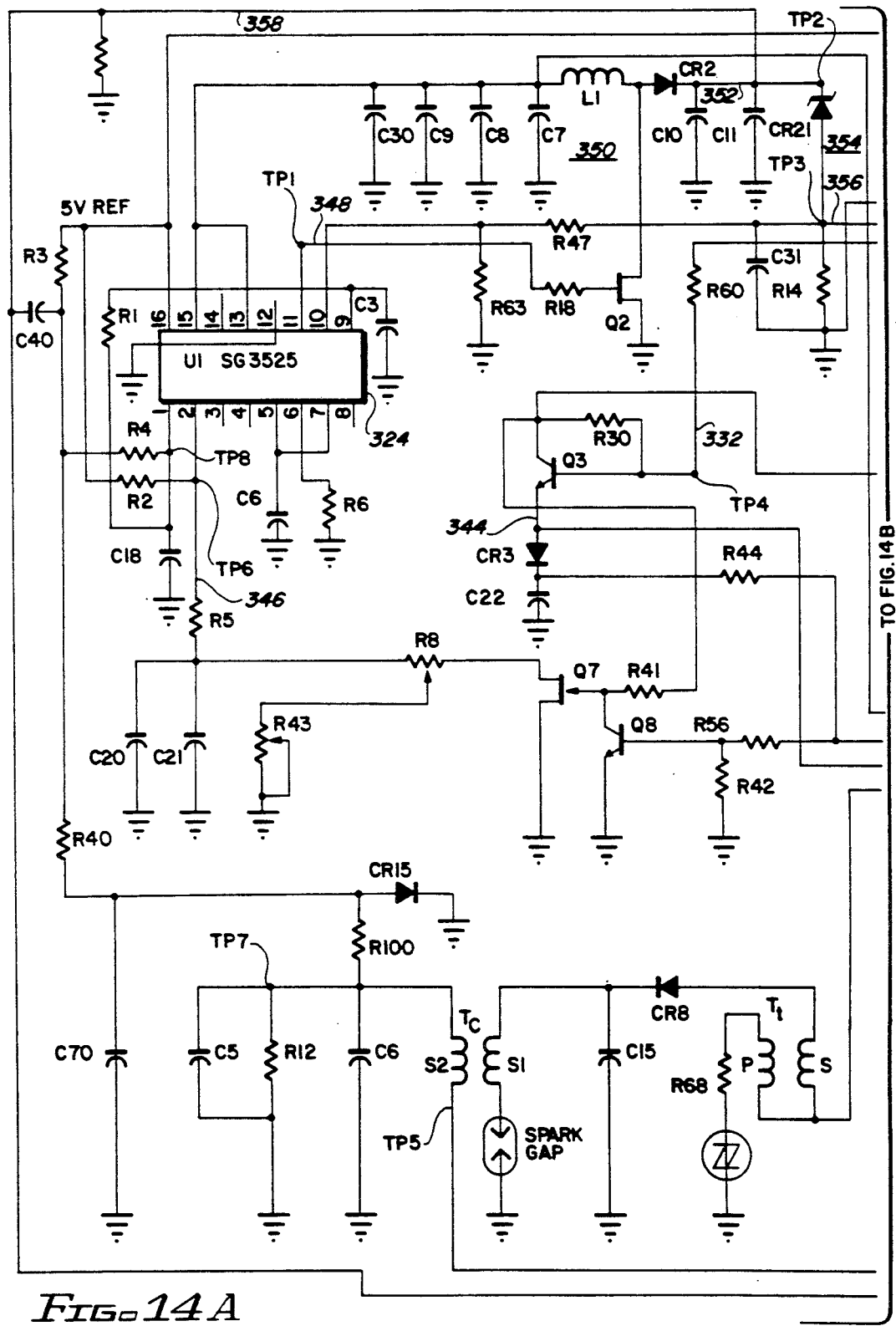
FIGS. 14A and 14B, when placed side by side as indicated thereon, illustrate an electrical schematic of the control circuit shown in block diagram form in FIG. 13.
Figure 14B:
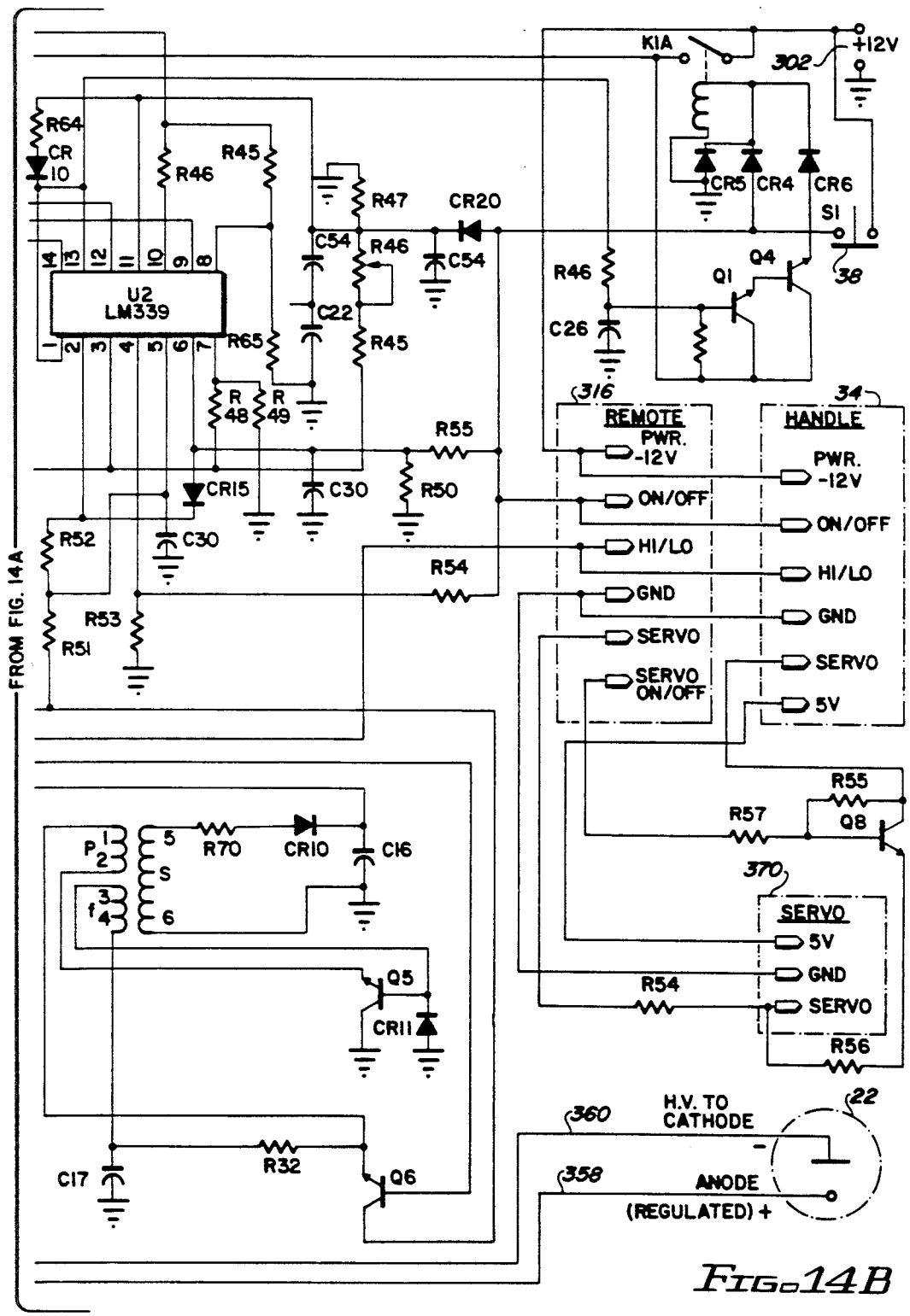

For a further detailed description of the operation of the control circuit of the present invention reference is now made to FIGS. 14A and 14B which, when placed side by side with FIG. 14A to the left of FIG. 14B, illustrates an electrical schematic of the present invention.

As can be seen FIG. 14, is a very detailed schematic diagram of the circuit for controlling the present invention. In the ensuing description, the purpose of the various components, such as resistors, capacitors, diodes and so forth, will not be described in detail as it is believed that one of ordinary skill in the art of circuit design will readily understand and see the purpose of these various components. However, it is believed that the ensuing description will provide sufficient details of the electronic circuitry to enable one skilled in the art to not only understand the operation of the circuit but also to construct the circuit.

Reference is first made to the top right hand corner of FIG. 14B wherein the power source 302 is shown as providing +12V DC power to the control circuit. For purposes of explanation, the on/off control switch 38 is shown separate from the handle, however, it is to be understood, as previously described, that switch 38 is located in the handle 34 and is connected to an on/off terminal as shown in handle 34 on the drawing.

As shown, switch 38 is a normally open push button contact switch. One terminal of switch 38 is connected to the +12 volt terminal of the power supply 302. When the operator depresses switch 38, +12 volts is applied to relay K1 through a diode CR4 causing the relay to energize. When K1 energizes, contact K1A closes, to thus provide 12 volts on the main power buss to the various integrated circuits and other circuit elements shown in FIGS. 14A and 14B. The self latching feature of K1 is accomplished by a latching or feedback signal from a terminal 13 on the quad comparator 319. When switch 38 is depressed, one set of comparators in the comparator 319 causes an internal latch in the comparator to provide a binary 1 signal on terminal 13 to the base of an NPN transistor Q1. Q1 is thus turned on, providing 12 volts, via its emitter, to the base of a second NPN transistor Q4. Q4 conducts applying 12 volts via a diode CR6 to provide current through K1 and thus latch the relay closed. When it is desired to turn the search light off, a second activation of the switch 38 will cause a second comparator in the quad comparator 319 to unlatch the output at pin 13, thus turning transistors Q1 and Q4 off and de-energizing relay K1.

Let it now be assumed that relay contact K1A is latched closed, thus supplying power to the control circuit. Upon energization of the circuit the first action to take place is in the pulse width modulator 324 as shown in FIGS. 14A and 15. Modulator 324 begins generating at its output terminal 11 100 kilohertz pulses at TP1 on conductor 348. These pulses are applied to the gate electrode of a switching MOSFET transistor Q2 which turns on and off to control the conduction of a Shotky diode CR2. The combination of the transistor Q2 an inductor L1, the diode CR2, and two parallel connected capacitors C10 and C11 comprise the switched voltage multiplier current regulator 350. One of the key features of my invention is the design of this regulator 350 and its implementation in a search light to take the place of the two power supplies normally required to ignite and operate a search light. The manner in which this implementation is accomplished will be subsequently described.

Basically the regulator 350 functions as a flyback converter circuit to convert +12 volts DC, which is applied to one end of the inductor L1 at a point connected to a plurality of filter capacitors C7-C9 and C30, to convert the 12 volts DC to prescribed voltage levels extending between the ranges of 15 volts up to as high as 90 volts. I found that, with proper design of the inductor L1 and precise duty cycle control of the pulses firing the switch Q2, that I am able to provide the required open circuit and operating voltages from one power source without the addition of any large components. This is largely accomplished by designing my inductor L1 as an approximately 10 microhenry choke having 5.5 turns of number 17 magnet wire wound on a ferrite CNP core. This design allows me to achieve an inductor which is approximately ¼ to ⅜ of an inch in diameter and approximately 1 to 2 inches long. I also selected the capacitors C10, and 11 to be of the proper capacitance to provide the desired filtering. Capacitors C10 and C11 collectively have a capacitance of approximately 1,640 microfarads. Further, by properly selecting the frequency at which the MOSFET Q2 turns on and off, I can precisely control the operation of the switched regulator 350. This is due to the proper selection of the coil impedance of inductor L1 (i.e., core material and turns) in conjunction with the proper operating frequency. By these selections, I allow the output of the inductor L1, at the anode of the diode CR2, to ramp up towards saturation of the inductor core (i.e., Q2 turned on), and just before saturation of the core, turn off MOSFET Q2. Each time Q2 turns off the large amount of energy stored in L1 turns on diode CR2 and quickly charges capacitors C10 and C11. By so operating my switch regulator in this manner, I can quickly charge up the capacitors C10 and C11 from +12 volts to approximately 90 volts. This is not possible with a normal voltage doubler.

Having described the operation of the current regulator 350, reference is now made to a high voltage zener diode CR21 having its cathode connected to the output of the regulator at TP2. The anode of diode CR21 is connected to pin 9 on the comparator 319 and provides at the output of the anode the signal on TP3 shown in FIG. 15. Referring to FIG. 15, let it now be assumed that the output TP2 of the regulator has just ramped up to a prescribed voltage controlled by the conduction of CR21. The instant that the amplitude at TP2 achieves this voltage (e.g. 65 volts), diode CR21 conducts to thus supply a logic level signal of approximately +5 volts at TP3 to pin 9 of the comparator 319. It will also be noted that the signal on TP3 from the anode at diode CR2 is applied to pin 10 of the pulse width modulator 324. As shown in FIG. 15, this signal (on TP3) is utilized to switch off the pulse width modulator long enough to enable the lamp to be ignited. The instant that signal at TP3 goes to a binary 1, the pulses at TP1 as shown in FIG. 15, are inhibited, thus causing transistor Q2 to remain off. During the interval that the signal on TP3 is positive, the charge on capacitors C10 and C11 will remain high, as shown in FIG. 15, to thus supply the open circuit voltage on conductor 358 to the anode of the lamp 22 as shown in the lower right hand corner of FIG. 14B.

Reference is now made back to the comparator 319 of FIG. 14B. With the comparator 319 now turned on, an output pin 14 now provides the signal on TP4 to the base of an NPN transistor Q3 in the high voltage lamp igniter circuit 334. Transistor Q3 is an emitter follower and is now turned on to thus provide a +12 volt signal to the base of a switching transistor Q6 also located in igniter 334.

Switching transistor Q6 is also connected as an emitter follower and now provides a 12 volt signal to energize an oscillator transformer T0. The combination of the transformer T0, a resistor R70, a diode CR10, a capacitor C16, an NPN transistor Q5 and a diode CR11 comprise a switch controlled oscillator. In the preferred embodiment, the output of this oscillator, at the cathode of diode CR10, provides a 20 kilohertz signal which varies between ground and 300 volts. This 20 kilohertz signal is applied to the primary of a small trigger transformer designated Tt in the lamp igniter 334. The other end of the transformer primary is connected to ground via a resistor R68 and a SYDAC. The 300 volt kilohertz signal on the primary of Tt is stepped up to a 10 kilovolts signal at its secondary and applied to the anode of a high voltage diode CR8. The cathode of diode CR8 is connected to a 2,200 picofarad 6KV igniter capacitor C15 which is connected between the cathode of CR8 and ground. The cathode of CR8 is also connected to the primary winding S1 of a Tesla coil designated Tc. The other end of the primary S1 is connected to ground through a conventional spark gap as shown.

Capacitor C15 gets charged by the conduction of diode CR8. Each time diode CR8 conducts, it charges C15 a prescribed amount. After a finite period of time, or delay, the charge on capacitor C15 achieves a magnitude sufficient to allow the spark gap to jump (e.g. 5 to 6 kilovolts). Since the spark gap is connected in series with the primary of the Tesla coil Tc, a high voltage of approximately 10 kilovolts is impressed across the primary winding S1 and induced into the step up secondary winding S2 of the Tesla coil Tc to generate an approximate 50 kilovolt RF pulse. The instant that the spark gap fires, the high voltage RF pulse at TP5, as shown in FIG. 15 and on FIG. 14A, is generated to thus apply the high voltage pulse to the cathode of lamp 22.

Lamp 22 now fires as shown at TP5 generating the high voltage pulse Vf.

Prior to proceeding with a further description of the details of the circuit of FIG. 14, it is believed advantageous to now provide a description of the operation of the HI/LO beam switched voltage reference 342. It will be recalled from the previous description of FIG. 13 that the output signal at TP6 of voltage reference 342 arms or prepares the pulse width modulator 324 to initially bring the light into operation on the high beam mode when it is first fired. It will be further be recalled that, after a delay of approximately 2 to 3 seconds, that the light is automatically switched to the LO beam or current conservation mode. This operation is now explained by referring back to transistor Q3 of FIG. 14A. Also, referring to FIG. 15, it will be recalled that, when the signal on TP4 is generated, it turns transistor Q3 on. When transistor Q3 turns on, its emitter goes to +12 volts causing the diode CR3 to conduct. When diode CR3 conducts, current flows through CR3 through a resistor R44, a resistor R56, and into the base of a NPN transistor Q8. This current provides a positive voltage at the input for the base of transistor Q8, turning it on and thus applying ground to the gate electrode of a MOSFET transistor Q7. This ground signal, on transistor Q7, turns the transistor off, allowing its source electrode to now rise to a positive potential. This positive potential is shown in FIGS. 14A and 15 as an input to pin 2 of the pulse width modulator 324 at TP6. The potential of the voltage at pin 2 is provided by a voltage divider comprised of a 5 volt reference at pin 16 of the pulse width modulator 324 connected through a series voltage divider network comprised of resistors R2, R5, R8, and R43. It will be noted that resistors R43 and R8 are potentiometers. R43 is the high beam calibrate potentiometer and R8 is the low beam calibrate potentiometer. These two potentiometers are adjusted such that, when transistor Q7 is off, R43 is adjusted to make the voltage at TP6 at the proper amplitude to make the pulse width modulator oscillate at the correct frequency to generate the high beam signal. When transistor Q7 is turned on the source electrode of that transistor clamps the top of resistor R43 to ground thus isolating the high beam calibrate potentiometer R43. This allows the bottom of potentiometer R8 to be grounded to thus allow R8 to be adjusted to provide the proper voltage at pin 2 to calibrate the light so that the pulse width modulator puts out the proper pulses for low beam operation.

It will further be recalled that, once the lamp 22 is ignited, there is approximately a two to three second delay before the light automatically switches from the high beam mode to the low beam mode. This accomplished by now referring to the diode CR3 in the igniter 334 of FIG. 14A. Reference is also made to FIG. 15 to the TP4 signal line. When the signal on TP4 goes negative (at the instant of lamp ignition) transistor Q3 is turned off thus turning off diode CR3. As can be seen in FIG. 14A, a capacitor C22 and resistor R42 are connected to ground and each connected basically in parallel to form an RC delay network which allows capacitor C22 to slowly discharge after CR3 is turned off. As shown in FIG. 15, the input to the base of transistor Q8 will remain positive for approximately two to three seconds after TP4 goes low. It is this period of two to three seconds which appears on FIG. 15 showing the gradual decay of the signal on TP6 after TP4 is removed. It can now be seen that this delay in the control of TP6 is effected by the conduction of transistor Q8 which in turn controls the MOSFET transistor Q7. That is, after the delay, transistor Q8 turns off, thus allowing the transistor Q7 to turn on via the 12 volt buss applied to its gate electrode through a resistor R41. When transistor Q7 turns on, its source electrode clamps the bottom of resistor R8 to ground thus applying the low voltage beam control signal to pin 2 of the pulse width modulator 324.

Reference is now made to FIG. 15 wherein the description will pick up where the lamp has just fired as shown at TP5. As can be seen in FIG. 15, at the instant of ignition of the lamp, several things begin to happen simultaneously. The first thing to note is that upon ignition of the lamp, its impedance drops to a very low value. When this happens, a very high inrush current begins to flow through the lamp as indicated by the signal TP7 in FIG. 15. TP7 is shown in FIG. 14A. as being measured across a small 0.05 ohm shunt (resistor) R12 which always carries at least a portion of the lamp current. It will be noted that, at the instant of ignition, a very high current substantially the same length and duration as the high voltage RF pulse, flows through shunt R12. This is the aforementioned inrush or ignition current provided to the lamp. It will be noted that the majority of the current flowing through shunt R12 and the lamp is via shunt R12 to ground through the secondary S2 of the Tesla coil or transformer Tc and back to the switched voltage multiplier current regulator 350 via conductor 358. A distinct feature of the present invention is how it functions to not only limit the peak inrush or ignition current, but also how it functions to immediately switch to normal current mode regulation of the lamp at the instant of lamp ignition. These features are realized by first referring to TP2 of FIG. 15, where that signal begins to rapidly degenerate from its most positive level to a 15 volt level. It will be noted that the degeneration begins the instant that the high voltage pulse VF is applied to the lamp as shown at TP5. At that instant, it will noted that the TP3 and TP4 signals both go low (binary 0) at the instant of degeneration of the signal on TP2. The manner in which the signals on TP3 and TP4 are caused to go to a binary 0 state, is now explained by reference to the previously mentioned zener diode CR21 on FIG. 14A. The instant that the high voltage at TP2 begins to drop, diode CR21 immediately shuts off. Its anode, at TP3, now goes low toward ground, thus removing the inhibit signal at pin 10 of the pulse width modulator 324. As can be seen in FIG. 15, the modulator now begins to generate 100KHZ pulses with the width A at pin 11, the TP1 output. The power MOSFET at Q2 now begins to again operate to thus switch the current regulator 350 to begin generating an output regulated DC voltage of 15 volts as shown in FIG. 15. It should also be noted that when diode CR21 shut off, the anode thereof removed the signal on pin 9 of the quad comparator 319. The removal of this signal now causes the output at pin 14 of the comparator to cause the signal on TP4 to go low and thus turn off the transistor Q3 at the input to the switched voltage reference 342. The instant that transistor Q3 shuts off its emitter goes low to thus turn off the transistor switch Q6 and shut down the 20 kilohertz oscillator which is driving the trigger transformer Tt. Since the transformer Tt is no longer charging up capacitor C15 the Tesla coil Tc can no longer be energized.

Reference is now made to the signal line TP8 in FIG. 15 and also to TP8 at pin 1 of the input to the pulse width modulator 324 of FIG. 14A. It will be noted that pin 1 (TP8) of the pulse width modulator is connected to the lamp cathode via a series of resistors R4, R40, and R100, connected in series with the secondary (S2) winding of the Tesla coil Tc. It will be noted that the shunt resistor R12 is connected at a junction at the bottom of resistor R100 and to the top terminal of the secondary S2 of the Tesla coil. While lamp current always flows through the shunt R12 and the secondary of the Tesla coil Tc a portion of that lamp current also flows through the aforementioned resistors to provide a voltage at TP8 at pin 1 of the pulse width modulator. It will be noted in FIG. 15 that, prior to ignition of the lamp, that TP8 is at 0 volts. At the instant of ignition the voltage at TP8 ramps up in unison with the inrush current (TP7) and levels off at some predetermined value where it stabilizes at the same time that TP7 and TP2 stabilize.

Paying particular attention now to pins 1 and 2 of the pulse width modulator 324 it will be noted that pin 1 receives a 5 volt reference input from pin 16 of the modulator via resistors R3 and R4. It will also be noted that the voltage which appears at pin 1 varies in accordance with the current flowing through resistors R4, R40, R100 and the secondary S2 of the Tesla coil. Thus, it can be seen that the voltage at pin 1 will vary around the 5 volt reference in accordance with the amount of lamp current which is flowing through the lamp. The two input pins (1 and 2) to the modulator 324 are fed to a comparator in modulator 324. This, comparator continuously looks at the amplitudes of the two signals on pins 1 and 2 to regulate the duty cycle of the output pulses on pin 11 to thus not only control the intensity of the light beam but also to regulate the magnitude of the output voltage at TP2 from the current regulator to thus maintain a stable arc across the lamp.

To gain a greater appreciation of the electronic circuitry for controlling the operation of my invention, reference is now made back to the switched voltage multiplier current regulator 350 in FIG. 14A and in particular to the capacitors C10 and C11. As now can be seen, the open circuit voltage at TP2 (FIG. 15) is stored in a large capacitance (capacitors C10 and C11) across the lamp. During ignition this capacitance discharges the open circuit voltage across the lamp when the high voltage (VF) is applied to ionize the gas in the lamp. From the previous description it can be seen that the joules of energy applied to the lamp from the open circuit voltage needs to be of a sufficient magnitude to insure proper cathode or element heating of the lamp. This level of energy is dependent on the condition of the lamp as well as the temperature of the lamp. When the lamp is cold, the energy required is much higher than when a hot restart or re-ignition is attempted. Further, every time the lamp is ignited, erosion takes place at the lamp electrodes. It thus becomes apparent that, to insure reasonable life of the lamp, the amount of energy delivered to the lamp during ignition (open circuit voltage) should only be that which is required to insure proper ignition. The amount of energy (open circuit voltage) applied to the lamp is proportional to the capacitance and voltage potential that is stored in the capacitance (C10 and C11) across the lamp. In designing my light, and in order to achieve the miniaturization required, I found that when a capacitance was chosen that was large enough to insure ignition in a worse case condition (cold lamp and aged), it was too large for ignition of a hot lamp. I therefore chose a value of capacitance (C10 and C11) that would provide adequate power supply filtering, but was not sufficiently large enough to insure reliable ignition of the lamp. I then designed the switching transformer (L1) and the regulator electronics (comparator 319 and modulator 324) to be capable of responding fast enough with sufficient voltage magnitude to supply the open circuit energy (open circuit voltage) on a continuous basis until the lamp just reached its proper operating voltage and current. The instant that the capacitor (open circuit reservoir) starts to discharge, the power supply responds immediately to provide any and all additional open circuit voltage that is required to bring the lamp to its proper operating parameters. In past designs, the immediate discharge of the open circuit voltage was limited by insertion of a large expensive ballast resistor in series with the lamp supply line to limit the peak inrush current. This ballast resistor, if not bypassed or taken out of the circuit after ignition, reduced the efficiency of the power supply due to the IR drop. It also produced a considerable amount of heat. In view of the size and cost constraints imposed on an economical design for my search light, I felt that it was necessary to sufficiently reduce the peak inrush current during ignition by some other means. I found that by installing an inductor of proper inductance in series with the lamp provided a sufficient limiting of the peak inrush current. Even though the inductor did not degrade the efficiency of the power supply, or generate heat, or require bypassing after ignition, the size and cost became a prime consideration. In my invention, the secondary (S2) of the Tesla coil igniter is in series with the lamp supply line. I discovered that by redesigning the secondary (S2) of the Tesla coil and winding it on an iron or ferrite core I could achieve the proper inductance to limit the peak inrush current at the moment of ignition. In the preferred embodiment, this design consists of four turns of wire on the primary winding and forty-one turns on the secondary wound on a ferrite or magnetic core. By incorporating this larger inductance in the Tesla coil igniter, which is in the direct output of the switching regulator 350, I was able to utilize the Tesla coil as a part of the power supply without a filter. The Tesla coil secondary now functions as three major components within the power supply. This allowed me to greatly reduce the component count, size, and cost of the lamp power supply or control circuitry.

In order to achieve the miniaturization required, I also had to solve the problem of the reduction of size, complexity and cost of the overall igniter system of my invention. The RF igniter 334 consists of the aforementioned Tesla coil Tc, the secondary winding of which is used to superimpose the high voltage RF pulse on the lamp supply line. As previously described the Tesla is excited by the use of the spark gap as shown in FIG. 14A. In the past, a large high voltage transformer was required to charge a capacitor and fire the spark gap on a pulse by pulse basis. To enable this to happen, the transformer had to be of considerable size in order to provide enough energy on every cycle. In my invention, I implemented a design using a very small transformer capable of delivering very high voltage, but the current was not sufficient enough to charge the capacitors and fire the spark gap on each pulse. I found however, that by inserting a high voltage diode, such as diode CR8, in series with the primary (S) of a small trigger transformer (such as Tt) and a small capacitor (such as C15) and a spark gap, that I could, by running the small transformer at a very high rate ( 20 kilohertz) I was able to charge up the igniter capacitor (C15) at an extremely fast rate to a level sufficient enough to bridge the spark gap. By firing the spark gap with a high voltage DC pulse, the output of the igniter becomes monopolar. I also discovered that providing a high voltage pulse of proper polarity to the lamp greatly reduced the level of voltage required to ionize the gas to a level sufficient to insure proper ignition. I am thus able to fire my lamp at a lower voltage than heretofore possible. In my invention, this phasing is accomplished by the proper phasing of the primary and secondary windings of the Tesla coil, thus enabling me to control the polarity of the output to the lamp.

As previously mentioned, the present invention also has a low voltage detection circuit to turn the search light off to preserve the battery in the event the battery begins to run low on its charge. This feature of the invention is best understood by now referencing FIG. 14B. A low voltage monitor is shown in FIG. 14B and is comprised of a resistive voltage divider network made up of a resistor R47, a potentiometer R46, and fixed resistor R45, which are connected between the +12 volt power supply buss and ground. A resistor R64 is connected to the junction of resistors R46 and R47 and is also connected in series with a diode CR10 having its cathode connected to pin 13 of the comparator 319. Further, the junction of resistors R46 and R47 are connected to a voltage cutout monitor pin 11 on the comparator 319. The voltage at the junction of resistors R46 and R47 is adjusted by potentiometer R46 to some predetermined level, such as 9 volts, signifying a low battery condition sufficient to cut off the light. During normal operation of the light, the voltage appearing at the junction of resistors R46 and R47, and thus at pin 11 of the comparator, is of a sufficiently high magnitude to prevent the comparator from turning off the light. However, when the voltage at the junction of resistors R46 and R47 drops below the predetermined value, for example 9 volts, the comparator unlatches the output at pin 13, thus causing the input to transistor to Q1 to go negative turning off transistors Q1 and Q4 and unlatching relay K1. This turns off the light.

It was also previously mentioned that the present invention has the feature of being able to override the low battery detection system. This is best shown by now referring back to the switch 38 on FIG. 14B. It will be noted that switch 38 is connected to an anode of a diode CR20 which has its cathode connected to the junction of resistors R46 and R47. Thus it can seen, when switch 38 is depressed by the operator, 12 volts is applied to diode CR20 to cause it to conduct thus clamping the junction of resistors R46 and R47 to 12 volts. This 12 volts is now applied via resistor R64 to the anode of diode CR10 causing CR10 to thus conduct. When CR10 conducts, its cathode goes to plus 12 volts thus driving the output pin 13 of the comparator to 12 volts and simultaneously applying 12 volts to the NPN transistor Q1 turning it and Q4 on to relatch the relay in a manner as previously described. It is obvious from the previous description of the operation of the relay latching system that, when switch 38 is released and if the battery voltage is still low, the transistors Q1 and Q4 will be turned off to unlatch the relay in the manner previously described.

The subject invention has been described with reference to certain preferred embodiments. It will be understood by those skilled in the art to which this invention pertains that the scope and spirit of the appended claims should not necessarily be limited to the embodiments described in detail herein.

What is claimed is:

1. A circuit for igniting and operating an arc lamp of the type adapted for use in a search light, comprising:
   (a) a power source for providing electrical energy to said circuit;
   (b) a modulator for generating output pulses and being controllable by input signals applied thereto to selectively interrupt the generation of the output pulses and to control the duty cycle of the output pulses in accordance with current flowing in said arc lamp;
   (c) a switched regulator, connected to a first electrode of said arc lamp, responsive to the output pulses from said modulator for generating, in a first instance, an output voltage of sufficient magnitude to enable said arc lamp to ignite upon the application of a high voltage pulse to said arc lamp and, in a second instance, occurring substantially at the time of ignition of said arc lamp, reducing the magnitude of the output voltage to a prescribed level sufficient to sustain operation of said arc lamp;
   (d) a comparator, responsive to the output voltage of said switched regulator, for providing an inhibit signal to said modulator to inhibit the generation of output pulses therefrom for a period substantially equal to the time between the occurrences of said first and second instances; and
   (e) a lamp igniter, connected between said modulator and a second electrode of said arc lamp, and responsive to the inhibit signal from said comparator, for generating a high voltage pulse, greater in magnitude than the output voltage from said switched regulator, to ignite said arc lamp, said lamp igniter providing to said modulator a signal proportional to arc lamp current to thereby direct said modulator to alter the duty cycle of the output pulses from said modulator to control the magnitude of the output voltage supplied, from said switched regulator, to the first electrode of said arc lamp and thereby control the current flowing through said arc lamp at a level sufficient to sustain the operation thereof.

2. A circuit for igniting and operating an arc lamp of the type adapted for use in a search light comprising:
   (a) a power source for providing electrical energy to said circuit;
   (b) a means, responsive to a trigger signal, for providing a high voltage pulse to a first electrode of said arc lamp to effect the ignition thereof and characterized by including means for minimizing inrush current through said arc lamp and providing a current path for the monitoring of operating current flowing through said arc lamp;
   (c) control means for providing a control voltage to a second electrode of said arc lamp to control the ignition and operation thereof and being characterized by including means for providing said control voltage at a first prescribed magnitude sufficient to enable said arc lamp to ignite upon application of said high voltage pulse to said arc lamp and, substantially at the time of ignition, reducing the control voltage to a second prescribed magnitude sufficient to sustain operation of said arc lamp;

(d) means, responsive to the control voltage from said control means for providing said trigger signal to said means for providing a high voltage pulse to generate said high voltage pulse and ignite said arc lamp; and (e) means, connected to said means for providing a high voltage pulse, for monitoring the current flowing through said arc lamp to control the magnitude of the control voltage supplied from said control means to said arc lamp to thereby regulate and control the current flowing through said arc lamp at a level sufficient to sustain the operation thereof.

3. In a search light of the type adapted to use an arc lamp, a circuit for switching the intensity of the light beam emitted by said arc lamp, comprising:

(a) control means connected across the electrodes of said arc lamp for igniting said arc lamp and controlling the operation thereof and being characterized by including, means for providing a control voltage to a one of said electrodes, and comparator means, connected to the other one of said electrodes, for monitoring the arc lamp current and having an input terminal for receiving a switched reference voltage for comparison with the arc lamp current;

(b) a switchable voltage reference source, connected to said input terminal of said control means, for providing said switched reference voltage thereto; and (c) means for providing a beam intensity control signal to said switchable voltage reference source to change the magnitude of the switched reference voltage with respect to the arc lamp current to cause said comparator means to vary the magnitude of the control voltage applied to said one of said electrodes and thereby change the intensity of the light emitted by said arc lamp by changing the magnitude of the current flowing through said arc lamp.

4. A circuit for igniting and operating an arc lamp of the type adapted for use in a search light, comprising:

(a) a power source for providing electrical energy to said circuit;

(b) control means connected across the electrodes of said arc lamp for generating an ignition signal for effecting ignition of said arc lamp and controlling the operation thereof and being characterized by including, means for providing a control voltage to one of said electrodes, and comparator means, connected to the other one of said electrodes, for monitoring the arc lamp current and having an input terminal for receiving a switched reference voltage for comparison with the arc lamp current; and (c) a switchable voltage reference source, for providing said switched reference voltage to said input terminal of said control means, characterized by including, delay means responsive to said ignition signal from said control means for holding said switched reference voltage at a first prescribed magnitude for a predetermined time, and after said predetermined time, changing said switched reference voltage to a second prescribed magnitude for sustained operation of said arc lamp.

5. A method of igniting and operating an arc lamp in a search light comprising the steps of:

(a) applying a control voltage of a first magnitude across said arc lamp;

(b) superimposing a high voltage pulse on said control voltage and igniting said arc lamp;

(c) sustaining the magnitude of said control voltage at said first magnitude for a prescribed period of time; and (d) at the end of said prescribed period of time, changing the magnitude of said control voltage to a second magnitude to thereby sustain operation of said arc lamp.

6. The method in accordance with claim 5, further including the step of switching said control voltage between said first and second magnitudes to selectively change the intensity of the light emitted by said arc lamp by altering the current flowing through said arc lamp.

7. In a search light of the type adapted to use an arc lamp, a method of changing the intensity of the light beam emitted by said arc lamp once it has been ignited, comprising the steps of:

(a) providing a beam intensity control signal, changeable between at least first and second states, to control the intensity of light emitted by said arc lamp;

(b) providing a regulated control voltage, at a prescribed magnitude, across said arc lamp to thereby control current flowing through said arc lamp and the intensity of the light emitted thereby; and (c) changing the state of said beam intensity control signal to change the magnitude of said regulated control voltage to thereby alter the current flowing through said lamp and change the intensity of the light emitted by said arc lamp.

8. A method of operating a search light of the type including an arc lamp, comprising the steps of:

(a) applying an energizing voltage to said search light;

(b) generating a controllable pulse width modulated signal having a variable duty cycle;

(c) generating a control voltage which varies in magnitude in accordance with the duty cycle of the pulse width modulated signal;

(d) applying said control voltage to a first electrode of said arc lamp;

(e) igniting said arc lamp by applying a high voltage pulse to a second electrode of said arc lamp;

(f) monitoring the current flowing through said arc lamp; and (g) controlling, in response to the monitoring of the arc lamp current, the duty cycle of the pulse width modulated signal to thereby regulate and control the magnitude of the control voltage and thus the current flowing through said arc lamp.

9. The method of claim 8 wherein the steps of monitoring and controlling further include the step of generating a light beam intensity control signal for altering the duty cycle of the pulse width modulated signal to further selectively control the magnitude of the control voltage, and thus the arc lamp current, to thereby control the intensity of the light beam emitted by said arc lamp.

10. The method in accordance with claim 9 wherein the magnitude of the control voltage is selectively changed to switch the search light between at least a low beam and a high beam of emitted light.

11. The method of claim 8 further including the step of monitoring the level of the energizing voltage and automatically turning the search light off when the energizing voltage drops below a prescribed level.

12. The method of claim 11 further including the step of turning the search light back on and operating said search light after the energizing voltage has dropped below said prescribed level.

13. A circuit for operating an arc lamp, comprising:
(a) a power source for providing electrical energy to said circuit;
(b) a pulse width modulator for generating output pulses and being controllable by input signals applied thereto to selectively control the operation of said pulse width modulator and the duty cycle of the output pulses being generated thereby;
(c) a switched regulator, responsive to the output pulses generated by said pulse width modulator, for generating a control voltage having a magnitude controlled by the duty cycle of said output pulses, said switched regulator being connected at an output thereof to a first electrode of said arc lamp and, in a first instance, providing thereto a control voltage of a first magnitude sufficient to enable said arc lamp to ignite upon the application of a high voltage pulse to a second electrode of said arc lamp and, in response to said control voltage, providing an inhibit signal to said pulse width modulator, at substantially said first instance, to inhibit the generation of the output pulses therefrom pending ignition of said arc lamp, said switched regulator, in a second instance occurring substantially at the time of ignition of said arc lamp, reducing the magnitude of said control voltage to a second magnitude sufficient to sustain operation of said arc and remove said inhibit signal from said pulse width modulator; and
(d) a lamp igniter, connected between said modulator and the second electrode of said arc lamp, responsive to the inhibit signal from said switched regulator for generating a high voltage pulse, greater in magnitude than said control voltage, to ignite said arc lamp at substantially said second instance, while providing to said pulse width modulator a signal proportional to arc lamp current to thereby direct said pulse width modulator to alter the duty cycle of the output pulses therefrom to control the magnitude of the control voltage supplied from the output of said switched regulator to the first electrode of said arc lamp, and thereby control the current flowing through said arc lamp at a level sufficient to sustain the operation thereof.

14. The circuit according to claim 13, wherein said switched regulator comprises at least an inductor having one end thereof connected to a first source of potential provided by said power source, a diode connected between the other end of said inductor and the output of said switched regulator, a capacitance connected between a second source of potential and the output of said switched regulator, a switch, responsive to the output pulses from said pulse width modulator, for providing pulses to said diode at said other end of said inductor to thereby enable said capacitance to be charged, via said inductor and said diode, to develop said control voltage at the output of said switched regulator, and a voltage controlled switch for sensing the magnitude of said control voltage and providing said inhibit signal to said pulse width modulator and said lamp igniter when said control voltage substantially achieves said first magnitude.

15. The circuit according to claim 14, wherein said switch is a switching semiconductor, said voltage controlled switch is a zener diode, and said diode is a Shotky diode.

16. The circuit according to claim 13, wherein said lamp igniter includes delay means responsive, in said first instance, to said inhibit signal for delaying lamp ignition to generate said high voltage pulse at substantially said second instance.

17. The circuit according to claim 13, wherein said lamp igniter includes a transformer having primary and secondary windings and further including trigger means, connected to said primary winding of said transformer, responsive to said inhibit signal for effecting the generation of said high voltage pulse from said secondary winding of said transformer, one end of said secondary winding of said transformer being connected to said second electrode of said arc lamp and the other end thereof connected to said pulse width modulator to provide thereto the signal proportional to arc lamp current, said secondary winding of said transformer and said switched regulator being connected in series with said arc lamp, said transformer having a prescribed inductance with the secondary winding thereof serving to limit inrush current, to said arc lamp at substantially the time of ignition of said arc lamp and to thereafter serve as a current filter at the output of said switched regulator for the current flowing through said arc lamp.

18. The circuit according to claim 17, wherein said primary winding of said transformer is connected at one end thereof to said trigger means and connected at the other end to a source of potential via a spark gap.

19. The circuit according to claim 18, wherein said lamp igniter further includes oscillator means, responsive to said inhibit signal between said first and second instances, for providing trigger pulses of a prescribed frequency to said trigger means and said trigger means further includes charging means, coupled to said one end of said primary winding of said transformer, responsive to said trigger pulses to develop a voltage charge of a magnitude sufficient to fire said spark gap via said primary winding of said transformer and generate the high voltage pulse from said secondary winding of said transformer to ignite said arc lamp at substantially said second instance.

20. A circuit for operating an arc lamp, comprising:
(a) a power source for providing electrical energy to said circuit;
(b) a pulse width modulator for generating output pulses and being controllable, in response to input signals applied thereto, to control the duty cycle of the output pulses;
(c) a switched regulator connected, at an output thereof, to a first electrode of said arc lamp, said switched regulator including means responsive to the output pulses from said pulse width modulator for generating, in a first instance, a control voltage of a first magnitude sufficient to enable said arc lamp to ignite upon the application of a high voltage pulse to a second electrode of said arc lamp and, in a second instance, following ignition of said arc lamp, reducing the magnitude of said control voltage to develop a sustainer voltage of a second magnitude sufficient to sustain operation of said arc lamp;
(d) a voltage controlled switch connected between the output of said switched regulator and an inhibit input terminal of said pulse width modulator, said voltage controlled switch, in response to said control voltage achieving substantially the first magnitude, providing an inhibit signal to said pulse width modulator to inhibit the generation of the output pulses therefrom for a period substantially equal to the time between the occurrences of said first and second instances; and (e) a lamp igniter, including high voltage pulse generating means connected between said pulse width modulator and the second electrode of said arc lamp, said lamp igniter further including trigger means, responsive to the inhibit signal from said voltage controlled switch, for triggering said high voltage pulse generating means to generate therefrom a high voltage pulse to ignite said arc lamp, said high voltage pulse generating means providing to said pulse width modulator a signal proportional to arc lamp current at substantially said second instance to thereby direct said pulse width modulator to alter the duty cycle of the output pulses from said pulse width modulator to reduce the control voltage at the output of said switched regulator to substantially said second magnitude and thereby regulate the current flowing through said arc lamp at a level sufficient to sustain the operation of said arc lamp.

21. The circuit according to claim 20, wherein said high voltage pulse generating means comprises at least a transformer having primary and secondary windings, the primary winding being connected to said trigger means and responsive to a trigger signal therefrom for inducing a voltage in the secondary winding to thereby generate the high voltage pulse from said high voltage pulse generating means, said transformer having a prescribed inductance, the secondary winding of said transformer being connected in series with said arc lamp at the time of ignition and further serving as a filter for the current flowing through said arc lamp following the ignition thereof.

22. A mono-polar firing circuit for an arc lamp, comprising:

(a) a modulator for generating output pulses and being controllable by an inhibit signal applied thereto to control the generation of the output pulses from said modulator;

(b) a switched regulator having an output connected to a first electrode of said arc lamp, said switched regulator responsive to the output pulses from said modulator for providing a control voltage to said arc lamp of a prescribed magnitude sufficient to enable ignition of said arc lamp upon the application of a mono-polar high voltage pulse to a second electrode of said arc lamp, said switched regulator including switch means connected across the output thereof for generating and providing said inhibit signal to said modulator when said control voltage achieves substantially said prescribed magnitude to inhibit the generation of the output pulses from said modulator; and (c) a lamp igniter including, means responsive to said inhibit signal, for generating a plurality of charging pulses at an output thereof, means, connected to a second electrode of said arc lamp, including trigger means responsive to said plurality of charging pulses for developing a voltage charge of a prescribed magnitude to effect the generation of said mono-polar high voltage pulse to thereby ignite said arc lamp.

23. The mono-polar firing circuit according to claim 22, wherein said means for generating said plurality of charging pulses is a switch controlled oscillator which is turned on in response to said inhibit signal.

24. The mono-polar firing circuit according to claim 22, wherein said means including said trigger means comprises, a trigger transformer, responsive to said plurality of charging pulses, for generating a plurality of trigger pulses at an output thereof, a high voltage transformer having primary and secondary windings, said secondary winding being connected to the second electrode of said arc lamp, a spark gap connected between a source of potential and one end of said primary winding, a coupling diode connected between the output of said trigger transformer and the other end of said primary winding, and a capacitor connected between said other end of said primary winding and said source of potential, said coupling diode passing said trigger pulses to said capacitor to thereby develop a voltage across said primary winding and said spark gap of a magnitude which jumps said spark gap and discharges said capacitor through said primary winding to effect the generation of said mono-polar high voltage pulse from said secondary winding of said high voltage transformer.

25. The mono-polar firing circuit according to claim 24, wherein said high voltage transformer is a Tesla coil having a prescribed inductance and which serves to limit inrush current through said arc lamp upon the ignition thereof.

26. In a search light of the type adapted to use an arc lamp, a circuit for igniting and controlling the intensity of the light beam emitted by said arc lamp, comprising:

(a) a pulse width modulator for generating output pulses including, means responsive to an inhibit signal applied thereto for controlling the generation of said output pulses and comparator means, having first and second inputs, for comparing the magnitude of a switched reference voltage with the magnitude of a signal proportional to arc lamp current to selectively control the duty cycle of the output pulses generated by said pulse width modulator;

(b) a switchable voltage reference source including delay means, responsive to said inhibit signal, for providing said switched reference voltage to the first input of said comparator means;

(c) a switched regulator, responsive to the output pulses generated by said pulse width modulator, for generating a control voltage having a magnitude controlled by the duty cycle of said output pulses, said switched regulator being connected, at an output thereof, to a first electrode of said arc lamp and, in a first instance, in response to a first prescribed duty cycle of said output pulses, providing to said arc lamp a control voltage of a first magnitude sufficient to enable said arc lamp to ignite upon the application of a high voltage pulse to a second electrode of said arc lamp, said switched regulator, in a second instance occurring substantially at the time of ignition of said arc lamp, reducing the magnitude of said control voltage to a second magnitude sufficient to sustain operation of said arc lamp, said pulse width modulator, at substantially said second instance, changing said output pulses to a second prescribed duty cycle to regulate said control voltage at substantially said second magnitude and thereby control the current flowing through said arc lamp at a first value to thereby control the light emitted by said arc lamp at a first level of intensity, said pulse width modulator, in a third instance, further changing said output pulses to a third prescribed duty cycle to change the current flowing through said arc lamp to a second value to thereby control the light emitted by said arc lamp at a second level of intensity;

(d) means, connected to the output of said switched regulator, for providing said inhibit signal to said pulse width modulator and said switchable voltage reference at substantially said first instance when said control voltage achieves substantially said first magnitude, said inhibit signal turning off said pulse width modulator between said first and second instances to inhibit the generation of the output pulses therefrom pending ignition of said arc lamp at substantially said second instance and activating said delay means in said switchable voltage reference source while effecting therefrom, at substantially said first instance, a change in the magnitude of said switched reference voltage from a first level to a second level, said delay means preventing said switched reference voltage from returning from said second level to said first level until substantially said third instance; and (e) a lamp igniter, connected between the second electrode of said arc lamp and the second input of said comparator means in said pulse width modulator and being responsive to said inhibit signal, for generating said high voltage pulse to ignite said arc lamp at substantially said second instance while providing to said comparator means a signal proportional to arc lamp current for comparison with the second level of said switched reference voltage to thereby direct said pulse width modulator to generate the output pulses at said second duty cycle to control the magnitude of said control voltage at said second magnitude and thereby regulate the current flowing through said arc lamp at said first value and control the light emitted by said arc lamp at said first level of intensity, said delay means in said switched voltage reference source changing said switched reference voltage from said second level to said first level at substantially said third instance to further direct said pulse width modulator to generate the output pulses at said third duty cycle and thereby regulate the current flowing through said arc lamp at said second value and control the light emitted by said arc lamp at said second level of intensity.

27. The circuit according to claim 26, wherein said switchable voltage reference source further includes means for adjusting the magnitude of said switched reference voltage to set the first and second levels thereof.

28. In search light of the type adapted to use an arc lamp, a circuit for igniting and controlling the intensity of the light beam emitted by said arc lamp, comprising:

(a) a pulse width modulator for generating output pulses including, means responsive to an inhibit signal applied thereto for controlling the generation of said output pulses and comparator means, having first and second inputs, for comparing the magnitude of a switched reference voltage with the magnitude of a signal proportional to arc lamp current to selectively control the duty cycle of the output pulses generated by said pulse width modulator;

(b) a switchable voltage reference source including delay means, responsive to said inhibit signal, for providing said switched reference voltage to the first input of said comparator means;

(c) a switched regulator, responsive to the output pulses generated by said pulse width modulator, for generating a control voltage having a magnitude controlled by the duty cycle of said output pulses, said switched regulator being connected at an output thereof to a first electrode of said arc lamp and, in a first instance, in response to a first prescribed duty cycle of said output pulses, providing to said arc lamp a control voltage of a first magnitude sufficient to enable said arc lamp to ignite upon the application of a high voltage pulse to second electrode of said arc lamp, said switched regulator, in a second instance occurring substantially at the time of ignition of said arc lamp, reducing the magnitude of said control voltage to a second magnitude sufficient to sustain operation of said arc lamp, said pulse width modulator, at substantially said second instance, changing said output pulses to a second prescribed duty cycle to regulate said control voltage at substantially said second magnitude and thereby control the current flowing through said arc lamp at a first value to thereby control the light emitted by said arc lamp at a first level of intensity, said pulse width modulator, in a third instance, further changing said output pulses to a third prescribed duty cycle to change the current flowing through said arc lamp to a second value to thereby control the light emitted by said arc lamp at a second level of intensity;

(d) means, connected to the output of said switched regulator, for providing said inhibit signal to said pulse width modulator and said switchable voltage reference at substantially said first instance when said control voltage achieves substantially said first magnitude, said inhibit signal turning off said pulse width modulator between said first and second instances to inhibit the generation of the output pulses therefrom pending ignition of said arc lamp at substantially said second instance and activating said delay means in said switchable voltage reference source while effecting therefrom, at substantially said first instance, a change in the magnitude of said switched reference voltage from a first level to a second level, said delay means preventing said switched reference voltage from returning from said second level to said first level until substantially said third instance;

(e) a lamp igniter, connected between the second electrode of said arc lamp and the second input of said comparator means in said pulse width modulator and being responsive to said inhibit signal, for generating said high voltage pulse to ignite said arc lamp at substantially said second instance while providing to said comparator means a signal proportional to arc lamp current for comparison with the second level of said switched reference voltage to thereby direct said pulse width modulator to generate the output pulses at said second duty cycle to control the magnitude of said control voltage at said second magnitude and thereby regulate the current flowing through said arc lamp at said first value and control the light emitted by said arc lamp at said first level of intensity, said delay means in said switched voltage reference source changing said switched reference voltage from said second to said first level at substantially said third instance to further direct said pulse width modulator to generate the output pulses t said third duty cycle and thereby regulate the current flowing through said arc lamp at said second value and control the light emitted by said arc lamp at said second level of intensity; and (f) means for providing a light intensity control signal to said switchable voltage reference source to selectively control the switching of said switched reference voltage between said second and first levels to effect changes in the duty cycle of said output pulses from said pulse width modulator to thereby change the current flowing through said arc lamp between said second and first values respectively and thereby change the light emitted by said arc lamp by selectively switching between said second and first levels of intensity.

29. The circuit according to claim 28, wherein said switchable voltage reference source further includes means for adjusting the magnitude of said switched reference voltage to set the first and second levels thereof.

30. A method of igniting and operating an arc lamp, comprising the steps of:

(a) applying a control voltage of a first magnitude across said arc lamp;

(b) superimposing a high voltage pulse on said control voltage and igniting said arc lamp;

(c) reducing the magnitude of said control voltage from said first magnitude to a second magnitude; and (d) maintaining said control voltage at substantially said second magnitude while regulating the current flowing through said arc lamp at a prescribed value to sustain the operation of said arc lamp and control the intensity of the light emitted thereby.

31. The method according to claim 30 further including the steps of, regulating the current flowing through said arc lamp at said prescribed value for a prescribed period of time and, at the end of said prescribed period of time, changing the value of the current flowing through said arc lamp to a different prescribed value to change the intensity of the light emitted by said arc lamp.

32. The method according to claim 30 further including the step of selectively switching the current flowing through said arc lamp between said prescribed value and a second prescribed value to switch the intensity of the light emitted by said arc lamp between first and second intensity levels.

* * * * *